(12) United States Patent
Schollmayer et al.

(10) Patent No.: US 10,676,385 B2
(45) Date of Patent: Jun. 9, 2020

(54) DEVICE FOR STIRRING MOLTEN GAS

(71) Applicant: UMICORE AG & CO. KG, Hanau-Wolfgang (DE)

(72) Inventors: Jörg Schollmayer, Mainz (DE); Michael Heitzenröther, Alzenau (DE)

(73) Assignee: UMICORE AG & CO. KG, Hanau-Wolfgang (DE)

(*) Notice: Subject to any disclaimer, the term of this patent is extended or adjusted under 35 U.S.C. 154(b) by 122 days.

(21) Appl. No.: 15/552,589

(22) PCT Filed: Feb. 22, 2016

(86) PCT No.: PCT/EP2016/053642
§ 371 (c)(1),
(2) Date: Aug. 22, 2017

(87) PCT Pub. No.: WO2016/135084
PCT Pub. Date: Sep. 1, 2016

(65) Prior Publication Data
US 2018/0334404 A1 Nov. 22, 2018

(30) Foreign Application Priority Data
Feb. 23, 2015 (EP) .................................. 15156128

(51) Int. Cl.
*B01F 7/00* (2006.01)
*C03B 5/187* (2006.01)
(Continued)

(52) U.S. Cl.
CPC .............. *C03B 5/187* (2013.01); *B01F 7/001* (2013.01); *B01F 7/00033* (2013.01);
(Continued)

(58) Field of Classification Search
CPC ......... C03B 5/18; C03B 5/187; C03B 5/1875; B01F 7/00275; B01F 7/00316
See application file for complete search history.

(56) References Cited

U.S. PATENT DOCUMENTS 2,570,079 A 10/1951 Spremulli
3,316,983 A 5/1967 Goodman
(Continued)

FOREIGN PATENT DOCUMENTS

DE 830 879 C 2/1952
DE 2 220 213 A1 11/1973
(Continued)

OTHER PUBLICATIONS

Written Opinion of the International Search Authority dated Jun. 30, 2016 for International Patent Application No. PCT/EP2016/053642, (10 pages).
(Continued)

*Primary Examiner* — Cynthia Szewczyk
(74) *Attorney, Agent, or Firm* — Smith, Gambrell & Russell, LLP

(57) ABSTRACT

Stirrer (1) for stirring molten glass (16), whereby the stirrer (1) comprises —a shaft (2) having a tip (4) and having a central longitudinal axis (L), and —one or more inner stirrer blades (5,6) which are attached to the shaft (2), and —one or more outer stirrer blades (7,8) which are attached to the shaft (2), whereby the inner stirrer blades (5,6) are attached closer to the shaft (2) than the outer stirrer blades (7,8), whereby, when considering the stirrer in a cylindrical coordinate system (11), both the one or more inner stirrer blades (5,6) as well as the one or more outer stirrer blades (7,8) are disposed at an angle (α, β) to the central longitudinal axis (L), whereby said angle (α, β) is between 0° and 90° not including these values, and are disposed having a least a blade section with a normal vector (N, P, Q, R), on the side
(Continued)

Figure 9:
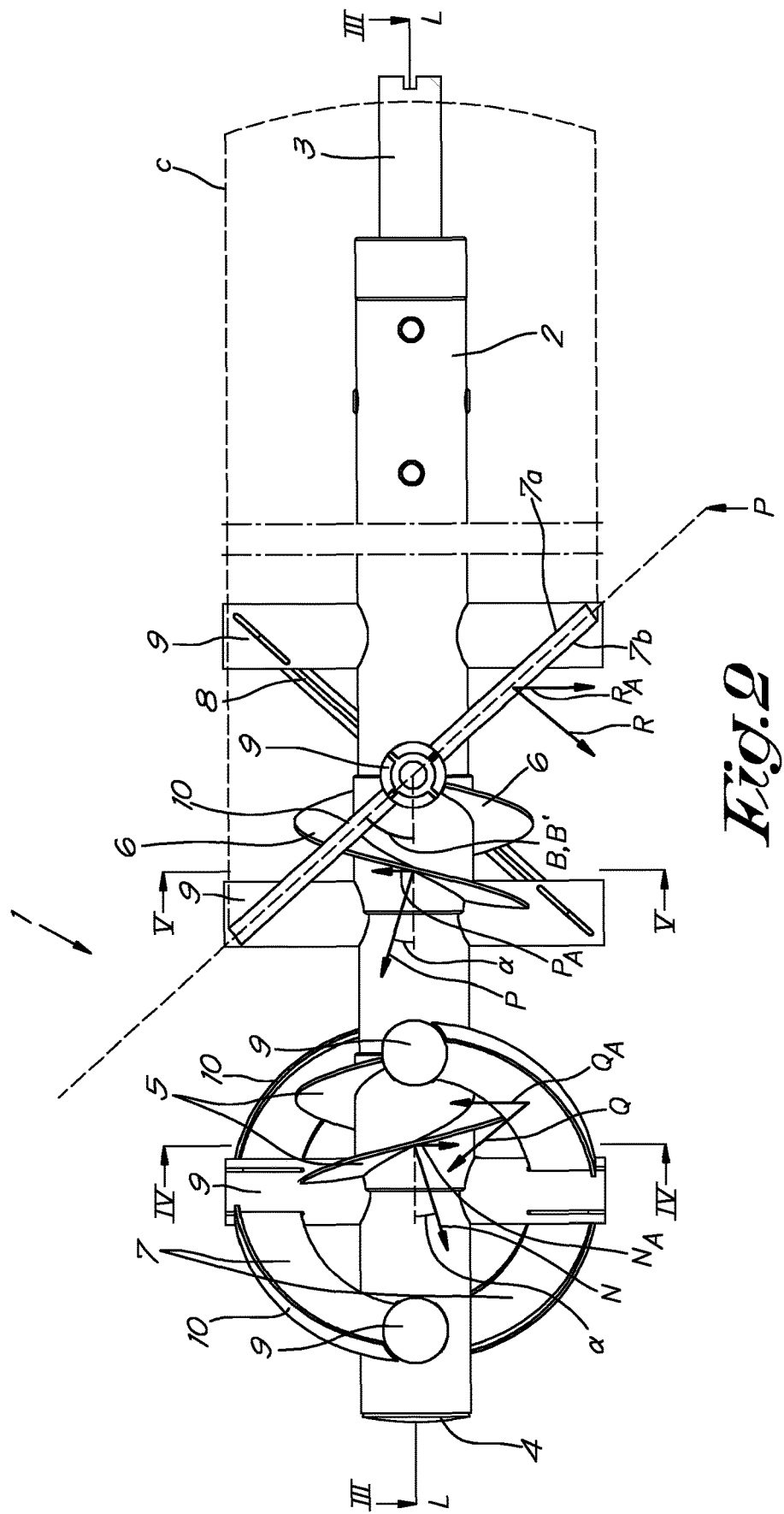

directed towards the tip (4), with an angular component ($N_A$, $P_A$, $Q_A$, $R_A$).

21 Claims, 15 Drawing Sheets

(51) Int. Cl.
    *C03B 5/167*     (2006.01)
    *C03B 7/092*     (2006.01)
    *C03B 7/086*     (2006.01)

(52) U.S. Cl.
    CPC .......... *B01F 7/0065* (2013.01); *B01F 7/0095* (2013.01); *B01F 7/00133* (2013.01); *B01F 7/00141* (2013.01); *B01F 7/00175* (2013.01); *B01F 7/00316* (2013.01); *B01F 7/00425* (2013.01); *B01F 7/00433* (2013.01); *B01F 7/00908* (2013.01); *C03B 5/1672* (2013.01); *C03B 5/1675* (2013.01); *C03B 7/086* (2013.01); *C03B 7/092* (2013.01)

(56) References Cited

U.S. PATENT DOCUMENTS

| | | |
|---|---|---|
| D208,725 S | 9/1967 | Danuser |
| 3,419,373 A | 12/1968 | Gould et al. |
| D229,848 S | 1/1974 | Mittelstadt |
| 4,054,272 A | 10/1977 | Cooke |
| D254,133 S | 2/1980 | Sheldon |
| D314,263 S | 1/1991 | Mueller |
| D316,100 S | 4/1991 | Kief |
| 5,611,221 A | 3/1997 | Tremel |
| D399,091 S | 1/1998 | Rubin |
| D421,030 S | 2/2000 | Panaccione |
| 6,296,068 B1 | 10/2001 | Frederick |
| 6,352,122 B1 | 3/2002 | Love |
| D474,567 S | 5/2003 | Clark |
| D474,568 S | 5/2003 | Clark |
| D475,372 S | 6/2003 | Dulkoski |
| D485,654 S | 1/2004 | Clark |
| D518,286 S | 4/2006 | Santos |
| D524,329 S | 7/2006 | Sheperd |
| D557,290 S | 12/2007 | Melegari |
| D557,984 S | 12/2007 | Kozlowski et al. |
| 7,628,232 B2 | 12/2009 | Koch et al. |
| D618,056 S | 6/2010 | Sly |
| 7,740,401 B2 | 6/2010 | Kozlowski et al. |
| D648,193 S | 11/2011 | Wheat |
| D682,640 S | 5/2013 | Motosko |
| 8,434,329 B2 | 5/2013 | Singer |
| D708,136 S | 7/2014 | Eguizabal Garcia |
| D722,965 S | 2/2015 | Perless et al. |
| D723,076 S | 2/2015 | Lampe et al. |
| D735,468 S | 8/2015 | Goldszer |
| D735,896 S | 8/2015 | Reusing et al. |
| 9,103,321 B1 | 8/2015 | Bardia |
| D747,143 S | 1/2016 | Schomacher et al. |
| D761,056 S | 7/2016 | Kemker |
| D788,197 S | 5/2017 | Ford |
| D798,923 S | 10/2017 | Homola |
| D800,807 S | 10/2017 | Schollmayer et al. |
| D800,808 S | 10/2017 | Schollmayer et al. |
| D801,927 S | 11/2017 | Cooper, II |
| 2004/0136263 A1* | 7/2004 | Backhaus ................ A21C 1/02 366/291 |
| 2005/0083782 A1 | 4/2005 | Gronau et al. |
| 2007/0003654 A1 | 1/2007 | Morimoto |
| 2008/0282738 A1 | 11/2008 | Yoshida |
| 2009/0025428 A1 | 1/2009 | Naumann et al. |
| 2013/0051173 A1 | 2/2013 | Braeker et al. |

FOREIGN PATENT DOCUMENTS

| | | |
|---|---|---|
| DE | 198 09 878 A1 | 9/1999 |
| DE | 10 2008 017 045 A1 | 10/2009 |
| DE | 202016100936 U1 | 4/2016 |
| EP | 0 160 830 A1 | 11/1985 |
| EP | 1 524 027 A2 | 4/2005 |
| EP | 2 353 707 A1 | 8/2011 |
| EP | 2 505 562 A1 | 10/2012 |
| EP | 2 955 162 A1 | 12/2015 |
| JP | S54-118454 U | 8/1979 |
| JP | S61-021922 A | 1/1986 |
| JP | S63-134040 A | 6/1988 |
| JP | H01-129231 U | 9/1989 |
| JP | H04-160018 A | 6/1992 |
| JP | H10-265226 A | 10/1998 |
| JP | 2004-307302 | 11/2004 |
| WO | 03/078337 A1 | 9/2003 |
| WO | 2006/007778 A1 | 1/2006 |
| WO | 2010/098328 A1 | 9/2010 |
| WO | 2011/020625 A1 | 2/2011 |

OTHER PUBLICATIONS

International Preliminary Report on Patentability dated Aug. 29, 2017 for International Patent Application No. PCT/EP2016/053642, (11 pages).
U.S. Appl. No. 29/572,347, Schollmayer, et al., filed Jul. 27, 2016.
U.S. Appl. No. 29/572,349, Schollmayer, et al., filed Jul. 27, 2016.
U.S. Appl. No. 29/572,350, Schollmayer, et al., filed Jul. 27, 2016.
International Search Report for International Application No. PCT/EP2016/053642 dated Jun. 30, 2016.
New Stirrer Technology for Glass Industry, posted on technology.matthey.com, published 2005, [online], [site visited Dec. 27, 2017], Available from internet, URL: http://www.technology.matthey.com/article/49/2/62-69/ (Year: 2005).
Apps in the Glass Industry, posted on chemgapedia,de, no posted date given, [online], [site visited Dec. 27, 2017], Available from Internet URL: http://www.chemgapedia.de/vsengine/tra/vsc/en/ch/25/heraeus/pt.tra/Vlu/vsc/en/ch/25/heraeus/pt_als_werkstoff/platin.vlu/Page/vsc/en/ch/25/heraeus/pt_als (Year: 2017).

\* cited by examiner

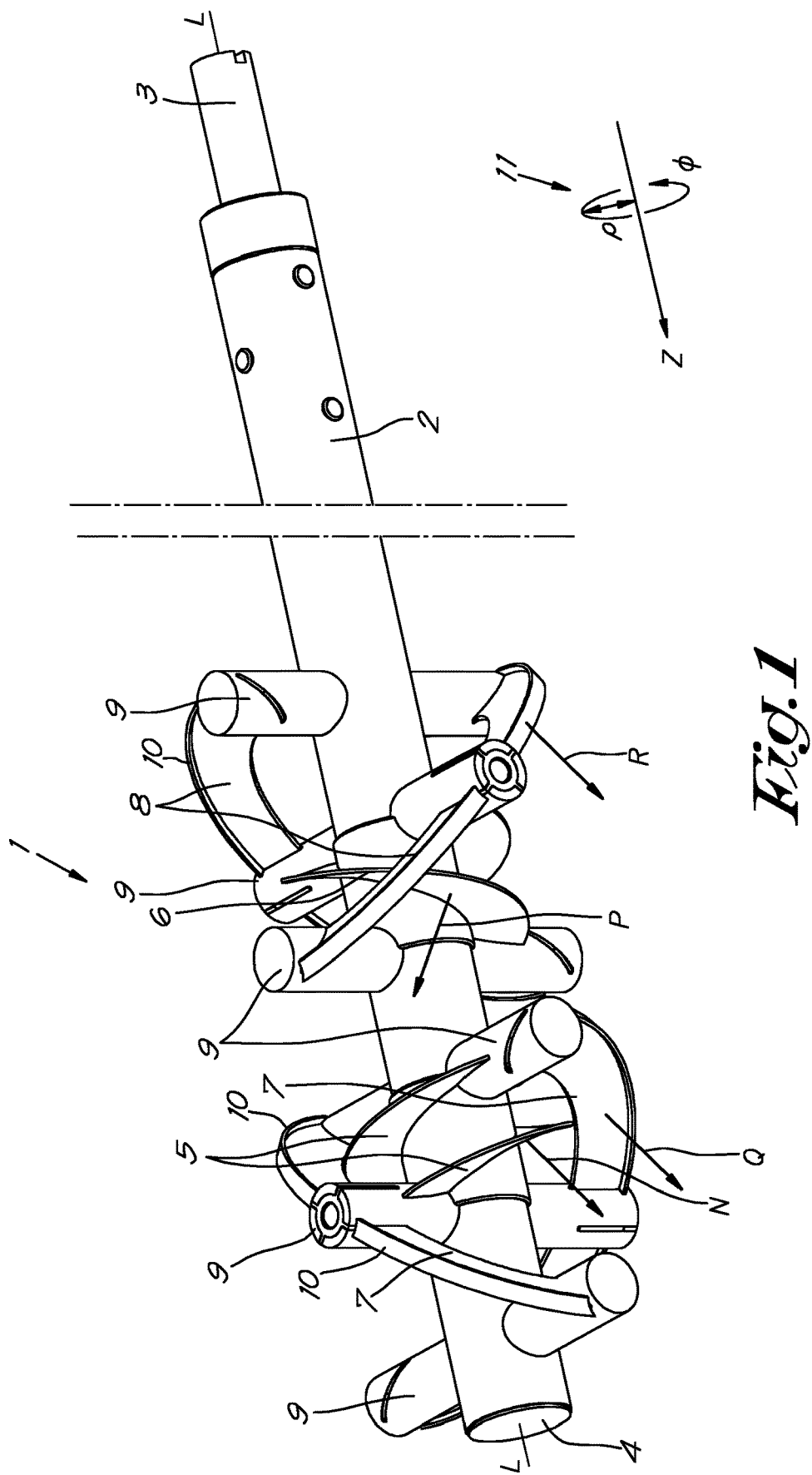

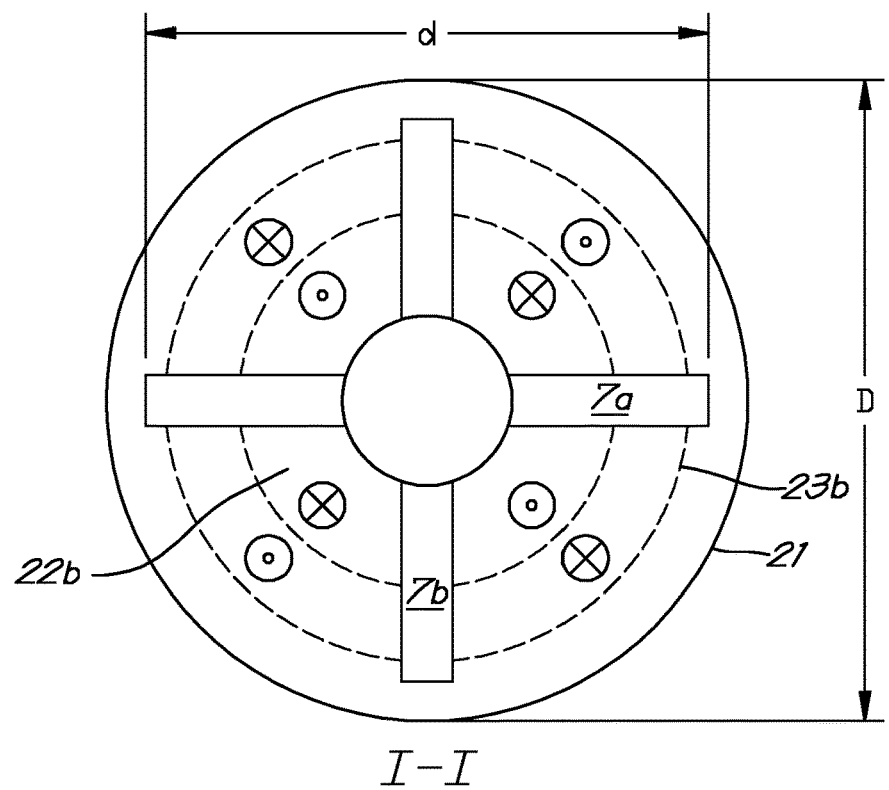
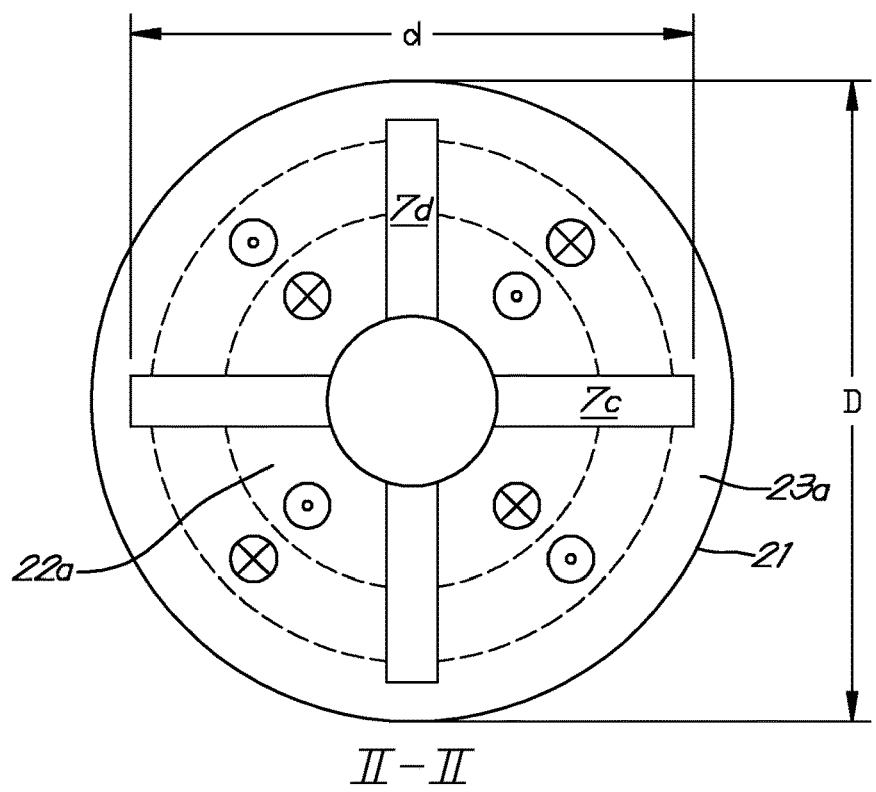
Fig.6B

DEVICE FOR STIRRING MOLTEN GAS

The invention concerns a device, in particular a stirrer, for stirring molten glass, and apparatus for stirring molten glass which comprises such a device (or a stirrer) and the use of such a device (or a stirrer) for homogenizing molten glass.

Molten glass needs to be homogenized before it can be used, especially in highly demanding applications. The reason for this is that the melt process of the constituents alone may leave inhomogeneities, which can present itself as discolorations or as sections with a different refractive index.

Because of the high viscosity of molten glass, leading to a laminar flow and a near absence of mixing by diffusion, a stirring apparatus is necessary. Such a stirring apparatus essentially consists of a stirring chamber in which a stirrer is placed. Such stirring apparatuses may work in a continuous process, or may be batch apparatuses, treating one batch of molten glass at a time.

Homogenization in molten glass relies on repeated elongation, chopping and redistribution of local inhomogeneities. It is therefore important to use a stirrer optimized to perform all these tasks.

Such stirrers for molten glass, including also the stirrer according the present invention, are usually made of platinum or a platinum-based alloy, because this is the one of the few materials having sufficient mechanical strength and chemical inertness at the temperatures needed for melting glass. As the platinum price is very high, an important further consideration when designing stirrers for molten glass is to limit the amount of material needed.

An alternative material that may be used, especially in less demanding glass stirring applications, is molybdenum or a molybdenum-based alloy, which may or may not be clad with platinum.

Alternatively, stirrers as described above and the stirrer according the present invention, for molten glass applications, can also be made of iridium or an iridium-based alloy, Furthermore, due to the extreme conditions, especially the combination of temperature and viscosity, wear of the stirrer, leading to platinum loss and glass contamination, is also a significant consideration, requiring the speed of stirrer blades to be as low as possible.

If a stirring apparatus is used in a continuous process, there is a further consideration that the stirrer should have no significant pumping function, as changes in the rotational speed will then cause changes in the pressure drop over the molten glass supply system, which will in turn create variations in the properties of glass products formed at the end of the molten glass supply system, e.g. sheets of display glass.

Some examples of known stirrers for molten glass having no or only limited pumping effect are given in DE102008017045, WO2011020625 and U.S. Pat. No. 8,434,329. Their stirrer blades are disposed parallel to the direction in which the stirrers are rotating or at right angles to this direction, meaning that either there is mainly cutting of stirrer blades through the molten glass leading to a chopping effect on inhomogeneities without much elongation of non-homogenous section and redistribution of inhomogeneities, or mainly horizontal movement of the molten glass and possible elongation of inhomogeneities, without significant chopping effect, so that the homogenization performance of these stirrers is not optimal.

In US2009/0025428 a non-pumping stirrer is disclosed with stirrer blades disposed at an angle between 0° and 90°, so that vertical as well as a horizontal movement is imposed on the molten glass, leading to a much better homogenization. The non-pumping effect is obtained by giving the stirrer blades different angles so that, given a certain rotational direction, the pumping action is upward for some stirrer blades and downward for other stirrer blades.

This causes however several relatively small movement cycles in the stirring chamber, which is also not optimal for the homogenization performance.

The present invention is intended to provide a solution to these and other disadvantages by providing a stirrer for stirring molten glass whereby the stirrer comprises:
  a shaft having a tip and having a central axis, and
  one or more inner stirrer blades which are attached to the shaft, and
  one or more outer stirrer blades which are attached to the shaft, whereby the inner stirrer blades are attached closer to the shaft than the outer stirrer blades,
  whereby, when considering the stirrer in a cylindrical coordinate system with the longitudinal axial coordinate of the cylindrical coordinate system defined to coincide with the central axis whereby the cylindrical coordinate system is further defined by a radial coordinate and an angular coordinate, both the one or more inner stirrer blades as well as the one or more outer stirrer blades are disposed at an angle to the central axis, whereby said angle is between 0° and 90° not including these values, and are disposed having a normal vector, on the side directed to the tip, with an angular component or are disposed having a blade section with a normal vector, on the side directed towards the tip, with an angular component.

The angular component of the normal vector ensures that in use both a horizontal as well as a vertical force is exercised on the molten glass, leading to a good homogenization performance.

For the avoidance of doubt, it is noted that attached can mean either directly attached, or indirectly attached by means of another structural element of the stirrer.

Note that depending on the definition of the direction of increasing value of the longitudinal axial coordinate and the definition of the direction of increasing values of the angular coordinate, the specified angular component of the specified normal vector of a given stirrer blade may be considered to be positive or negative. This is not relevant for the definition of the invention as the direction of the stirrer blades in this invention is only considered in relation to each other.

Due to the presence of inner and outer stirrer blades, more precise control of the movement of molten glass through the stirring chamber, and therefore more control over homogenization performance can be obtained by the designer of a stirrer.

In particular for example a cycling movement such as in US2009/0025428 can be avoided, so that a plug flow behavior of the molten glass through the mixes can be approximated. Of course, by appropriate placement of the inner and outer stirrer blades such cycling movement can also be enhanced if desired.

Further, a rapid mixing of molten glass from the inlet zone into the bulk of the molten glass in the stirred volume can be obtained, or avoided if so desired, thereby obtaining more or less mixing, as desired, with material having entered the stirring chamber earlier, so obtaining a good smoothing out of time-dependent composition variations.

Also the pumping effect can be better controlled, to be either absent, or to be more constant over a range of rotational speeds, while maintaining a placement of the individual stirrer blades which is optimal for homogenization, thereby again increasing the options for a stirrer designer to obtain a desired performance depending on the detailed requirements of a particular homogenization task.

As an alternative embodiment of the present invention, the one or more inner stirrer blades are mounted against the shaft and are preferably executed as helicoidal blades or a helicoidal blade.

In a preferred embodiment the one or more outer stirrer blades are mounted on rods or tubes extending at least partially in a radial direction from the shaft. Optionally, the one or more outer stirrer blades each have two ends, whereby each of these ends is mounted on a different one of said rods or tubes, whereby the rods or tubes used for mounting the ends of a specific outer stirrer blade have a different angular position and/or axial position on the shaft.

In an optional embodiment, the one or more outer stirrer blades are each mounted on two or more of said rods or tubes, whereby the rods or tubes used for mounting an outer stirrer blade are placed at angular positions on the shaft which are mutually different by at least 30° and which are preferably mutually different by 90°.

This way of mounting the outer stirrer blades, whereby they bridge the distance between two rods allows for relatively large stirrer blades to be used, thereby optimizing, compared to the known stirrers, the ratio of stirrer blade material, effective for homogenization and tube or rod material, which not effective for homogenization but is made of the same, equally expensive, material.

In a particular embodiment, at least one of the outer stirrer blades is an open flat ring-shaped elliptical segment, said at least one open flat ring-shaped elliptical segment is placed following a line formed by the intersection of a cylinder and a plane making an acute angle, between 0° and 90° excluding said values, preferably between 10° and 80° including said values, more preferably between 20° and 70° including said values, with the central axis of that cylinder, said central axis of the cylinder being co-linear with the central axis of the shaft of the stirrer.

Such an embodiment presents the advantage of allowing a continuous and homogeneous grasp of the molten glass due to an improved local pumping effect and shearing effect obtained due to the specific outer blade shape, preferably of all the blades.

Optionally, each of the outer stirrer blades is an open flat ring-shaped elliptical segment.

For the avoidance of doubt it is mentioned that rods or tubes may have any cross-sectional shape, such as, but not limited to, round, square, elliptical.

In another preferred embodiment the outer edge of at least one of the one or more outer stirrer blades is provided with a raised edge, whereby preferably all of the mentioned outer stirrer blades are provided with such an edge.

This enhances the smearing effect of the stirrer, and thereby causes an improved elongation of inhomogeneities, one of the major factors for good homogenization.

In another preferred embodiment the angular component of the normal vector of at least a blade section, in other words the entire blade or a part of a blade, of one or more of said inner and outer stirrer blades is negative and the angular component of the normal vector of at least a blade section of one or more of the inner and outer stirrer blades is positive.

This ensures that in use at least one stirrer blade moves the molten glass up and at least one stirrer blade moves the molten glass down, so that a repeated passage of at least part of the molten glass through the stirred volume is ensured. This repeated passage induces an increase of the mixing time and therefore homogenization quality of the molten glass.

In another preferred embodiment, the stirrer comprises two or more of said inner stirrer blades, whereby the angular component of the normal vector of at least one of said inner stirrer blades is negative and the angular component of the normal vector of at least one other of said inner stirrer blades is positive and whereby the number and size of said inner stirrer blades having a normal vector with a negative angular component is the same as the number and size of said inner stirrer blades having a normal vector with a positive angular component.

This ensure that there is no net pumping effect from the inner stirrer blades.

Similarly, to obtain a lack of pumping effect from the outer stirrer blades, in a preferred embodiment, the one or more outer stirrer blades in totality comprise two or more blade sections, whereby the angular component of the normal vector of at least one of said blade sections is negative and the angular component of the normal vector of at least one other of said blade sections is positive and whereby the number and size of said blade sections having a normal vector with a negative angular component is the same as the number and size of said blade sections having a normal vector with a positive angular component.

In yet another preferred embodiment at least a blade section of one of said one or more outer stirrer blades extends over (or traverse) a certain axial (or also called vertical) section of the stirrer, whereby at least one of said one or more inner stirrer blades is placed in the same axial section, whereby the signs of the angular components of the normal vectors of this inner stirrer blade and this blade section of the outer stirrer blade are opposite.

In the framework of the present invention, said axial section is a plane that is perpendicular to the central axis of the shaft of the stirrer.

This configuration allow a better shearing of the molten glass in a region defined at the interface between an inner blade and neighboring outer blade.

In a preferred embodiment, most, and preferably all, of the mentioned one or more inner and outer stirrer blades are disposed at an angle to the central longitudinal axis of the stirrer's shaft which is between 10° and 80° including said values, and which is preferably between 20° and 70° including said values.

It should be noted that in a preferred embodiment the angular component of the normal vector of an outer or inner stirrer blade on the side directed towards the tip, can be a single value or can have only a single sign over the entire outer or inner stirrer blade.

In this case an inner or outer stirrer blade only has one single blade section, so that in this case the term blade section of an outer stirrer blade is equivalent to the outer stirrer blade and the term blade section of an inner stirrer blade is equivalent to the inner stirrer blade.

The invention further concerns an apparatus for stirring molten glass comprising a stirring chamber and having a stirrer according to the invention which is mounted in the stirring chamber whereby the stirrer is rotatable around the central axis of the stirrer.

In such a context, the invention therefore discloses the use of the stirrer according to the present invention for stirring and therefore homogenizing molten glass.

The invention also concerns a plunger for gobbing molten glass, said plunger comprising the stirrer according to the invention, said stirrer comprising on its tip a gobbing member, in particular a piston head.

In this particular framework, the invention therefore discloses the use of the plunger according to the present invention for gobbing and/or pumping as well as homogenizing molten glass.

As an example of such a use, the invention concerns an apparatus for gobbing molten glass comprising a gobbing chamber and having a plunger according to the invention which is mounted in the gobbing chamber whereby the plunger is rotatable around its central axis and movable along said central axis.

In such a framework, the plunger according to the invention can be used not only on the purpose of stirring, with the stirring effect as described in the present patent application, but also on the purpose of pumping/gobbing molten glass when put in translation (vertical) movement along its central axis.

In a preferred embodiment of the stirrer and plunger according to the invention, the stirrer and the plunger are made of platinum or a platinum alloy or of molybdenum or a molybdenum-based alloy, or of iridium or an iridium-based alloy.

Figure 3:
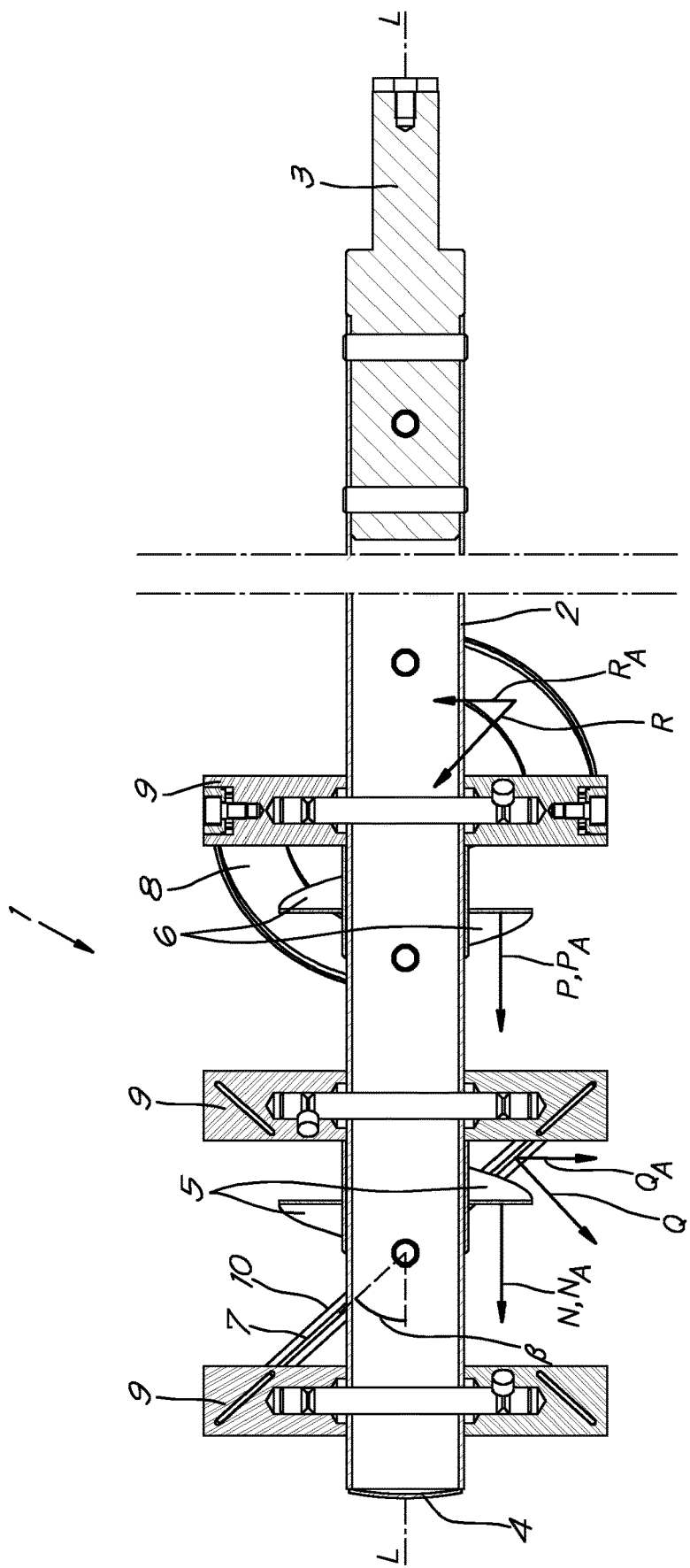
Figure 4:
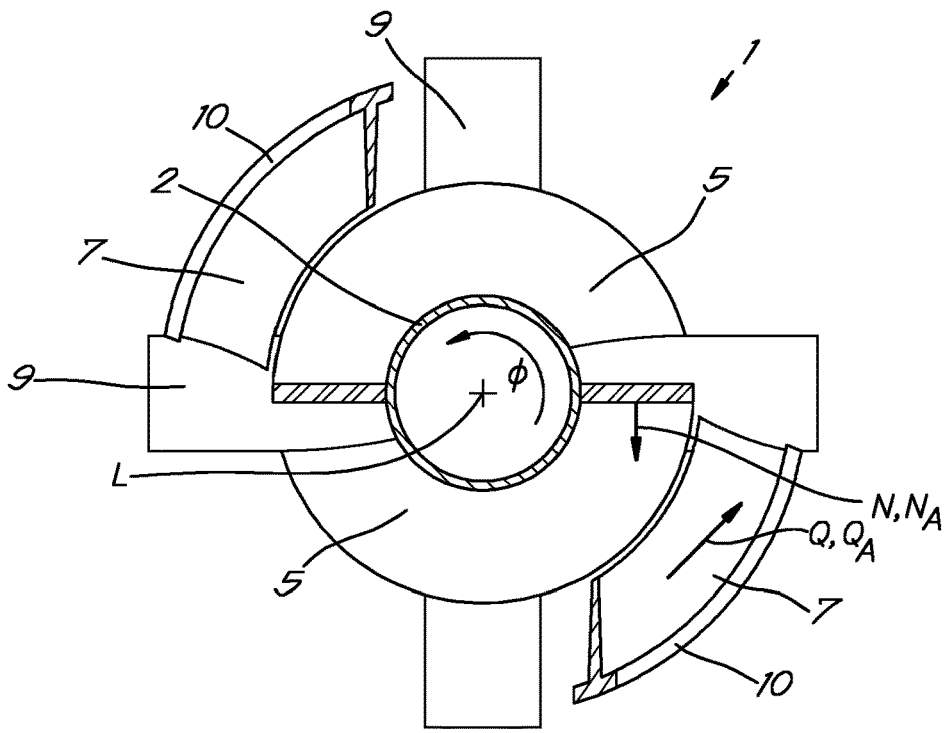
Figure 5:
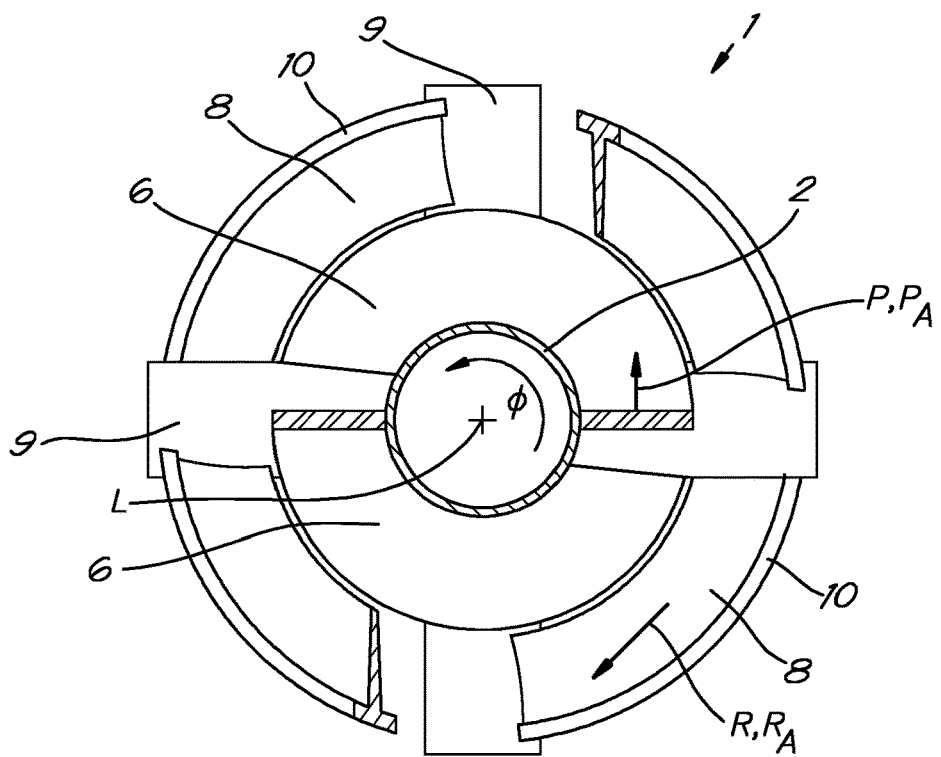
Figure 6A:
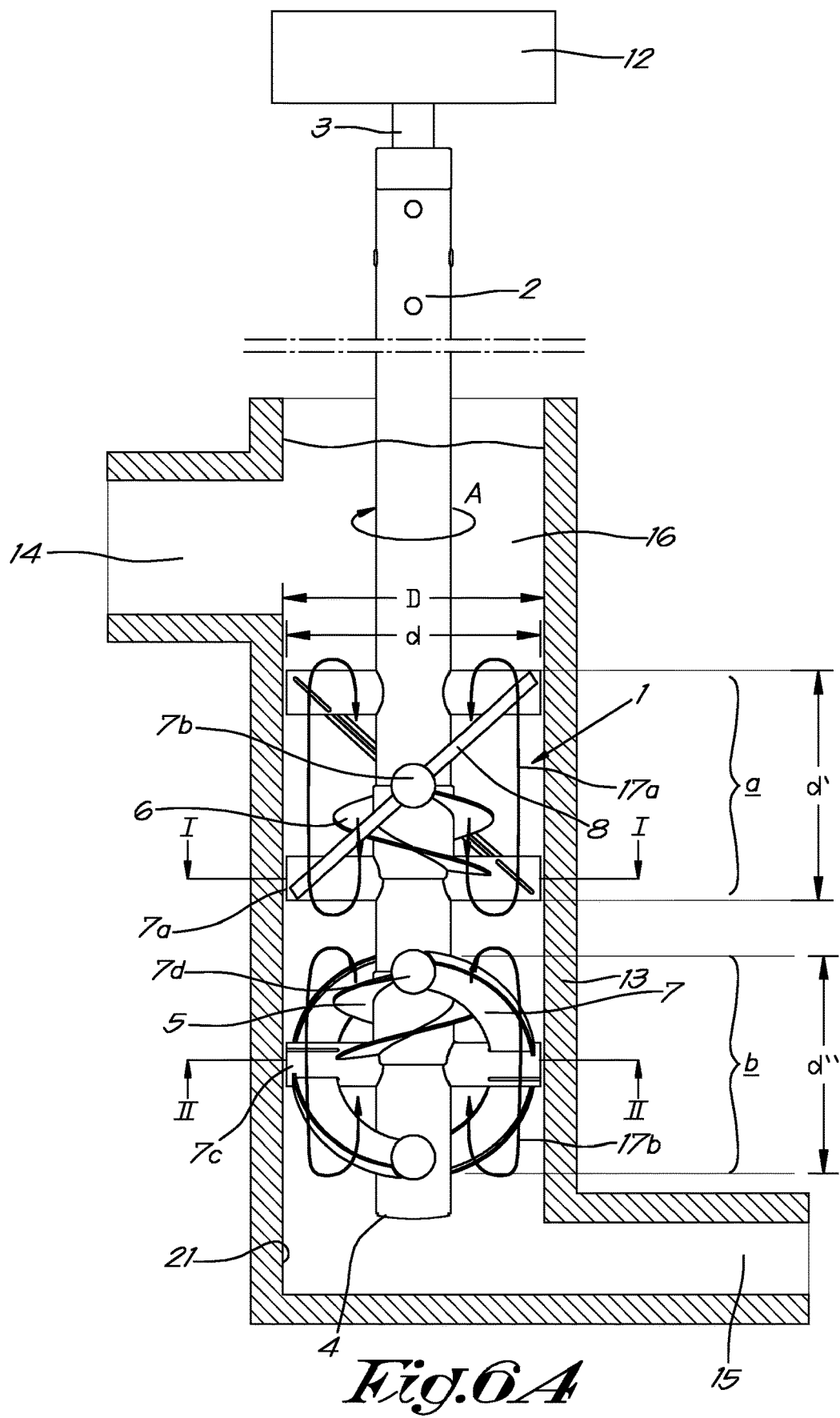
Figure 7:
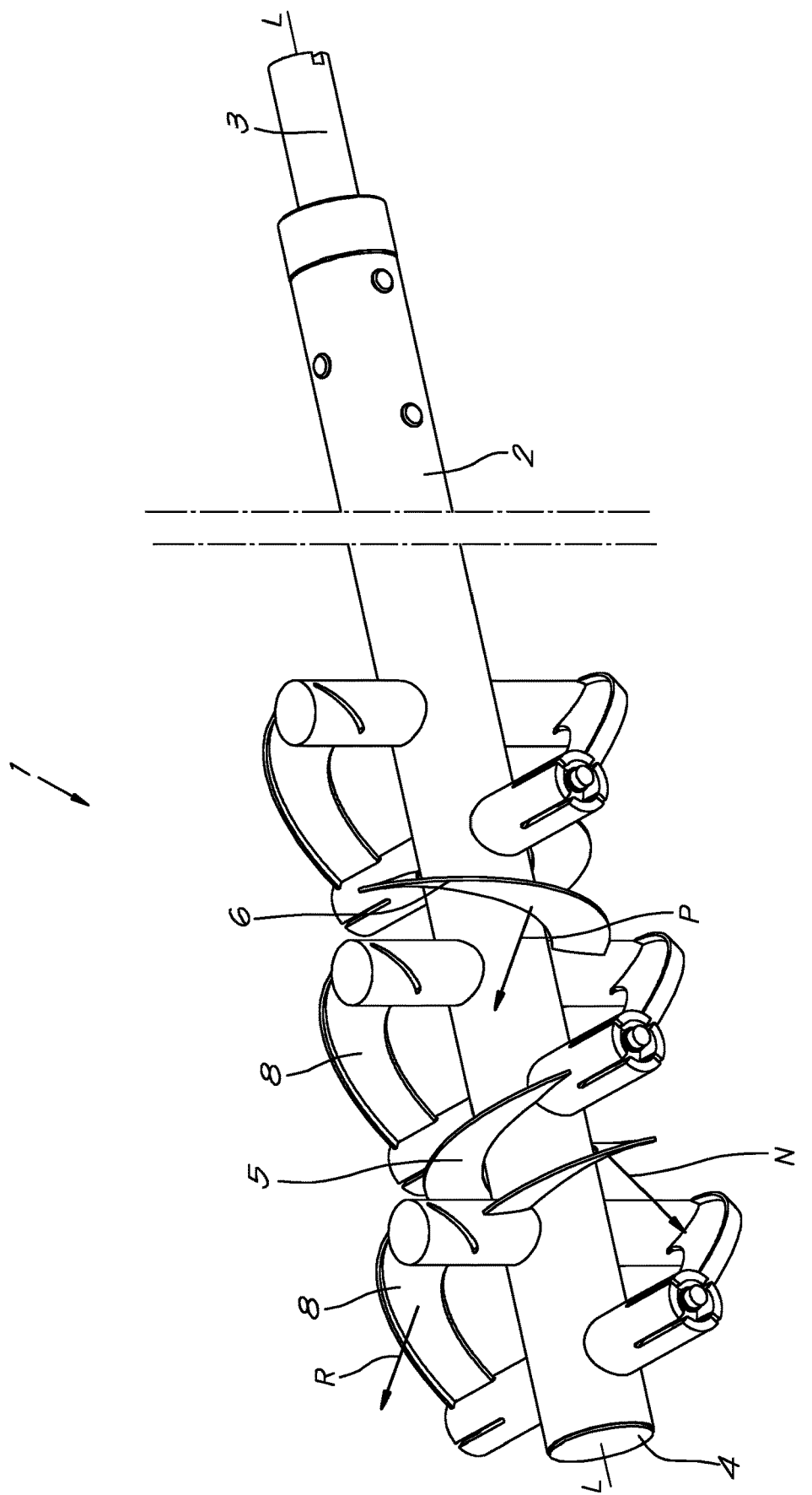
Figure 8:
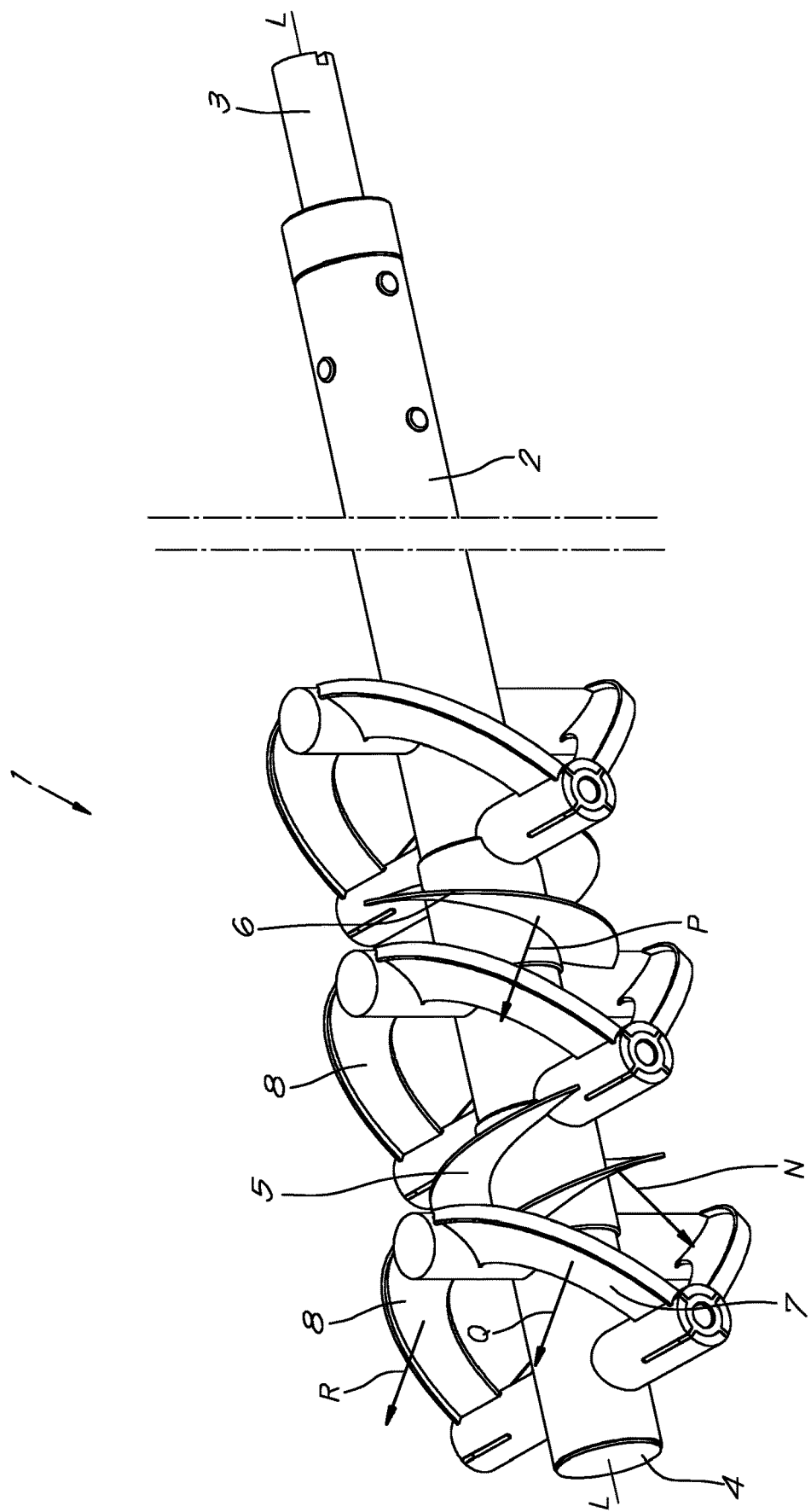
Figure 9:
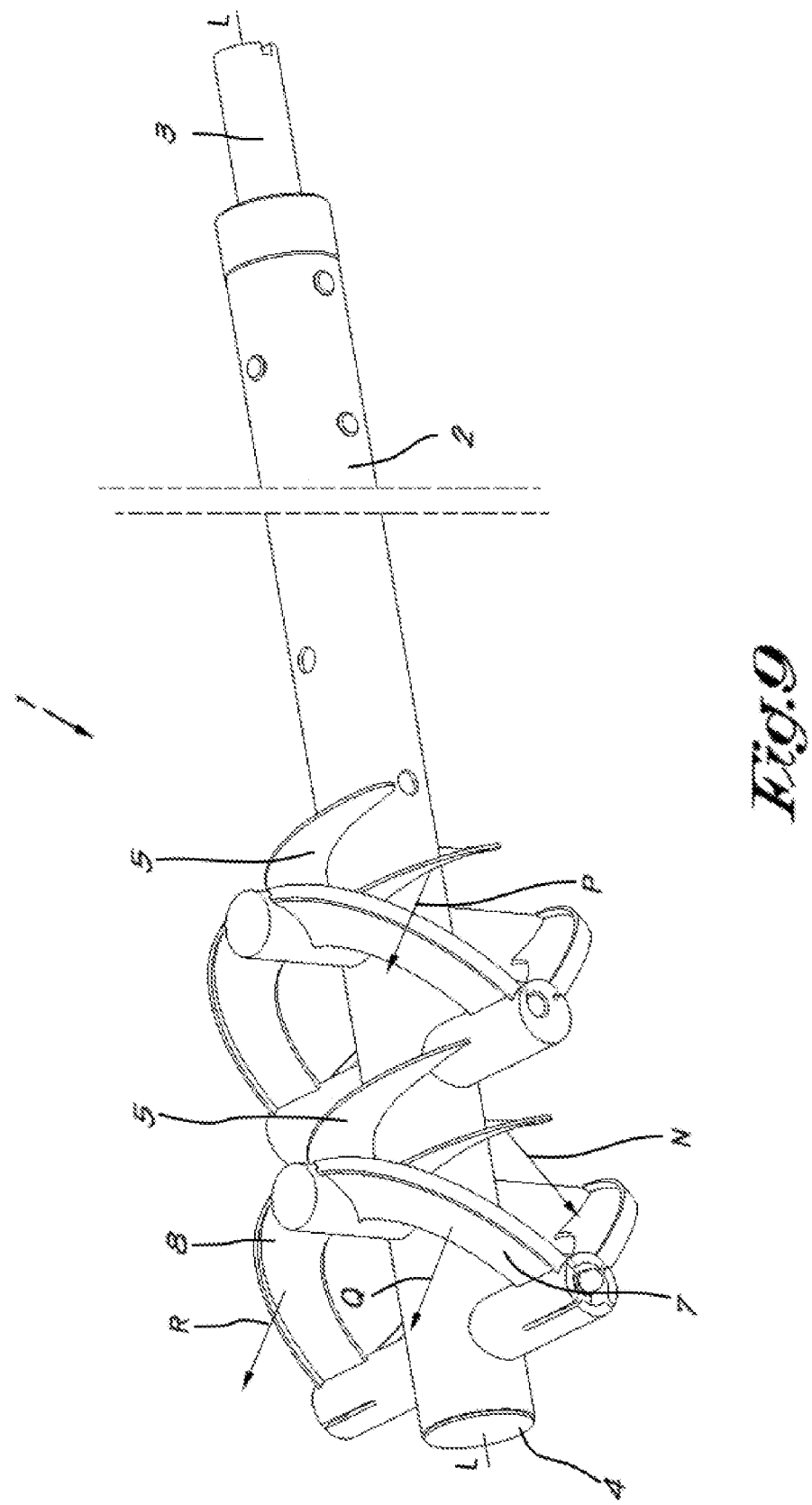
Figure 10:
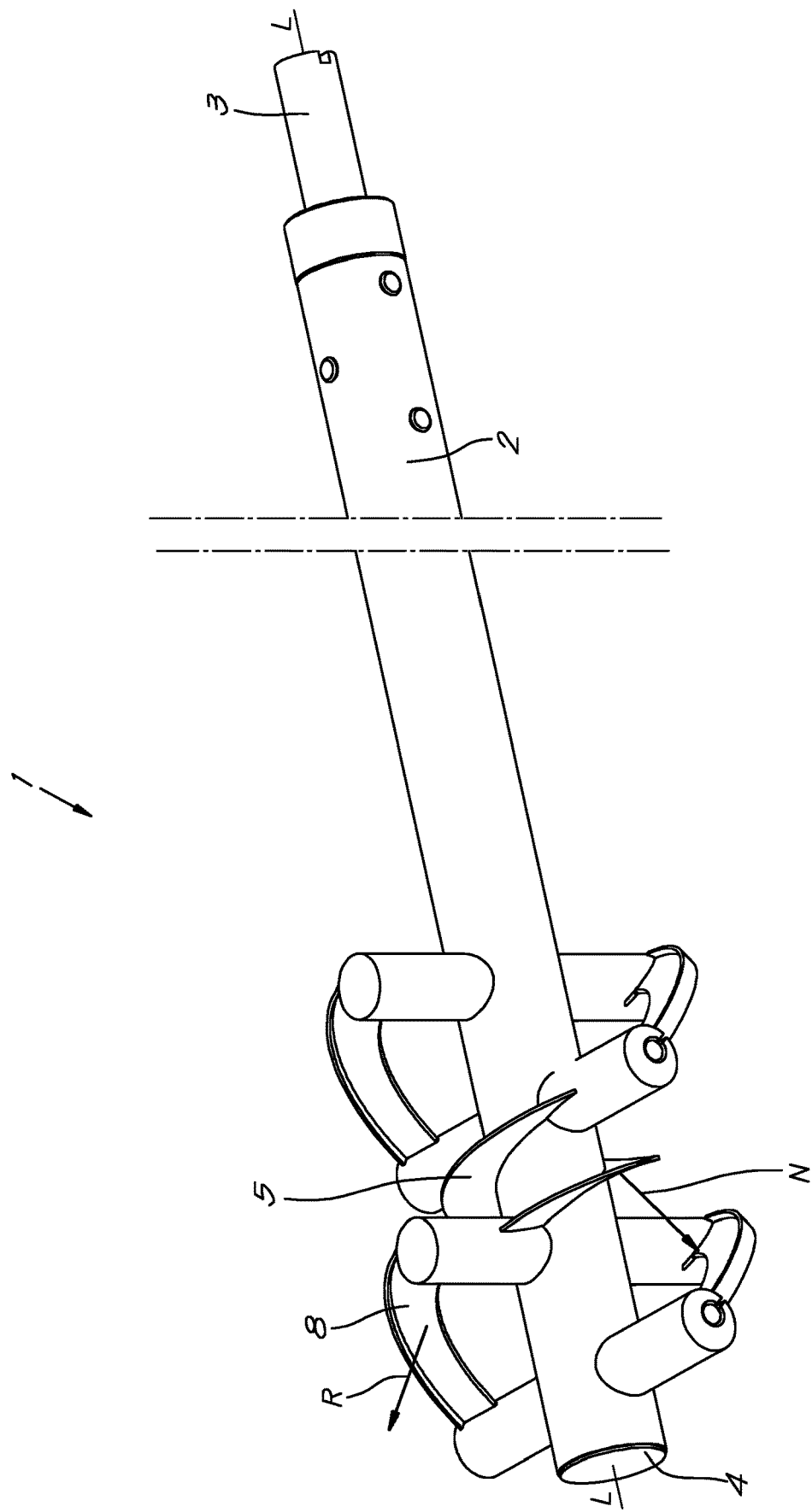
Figure 11:
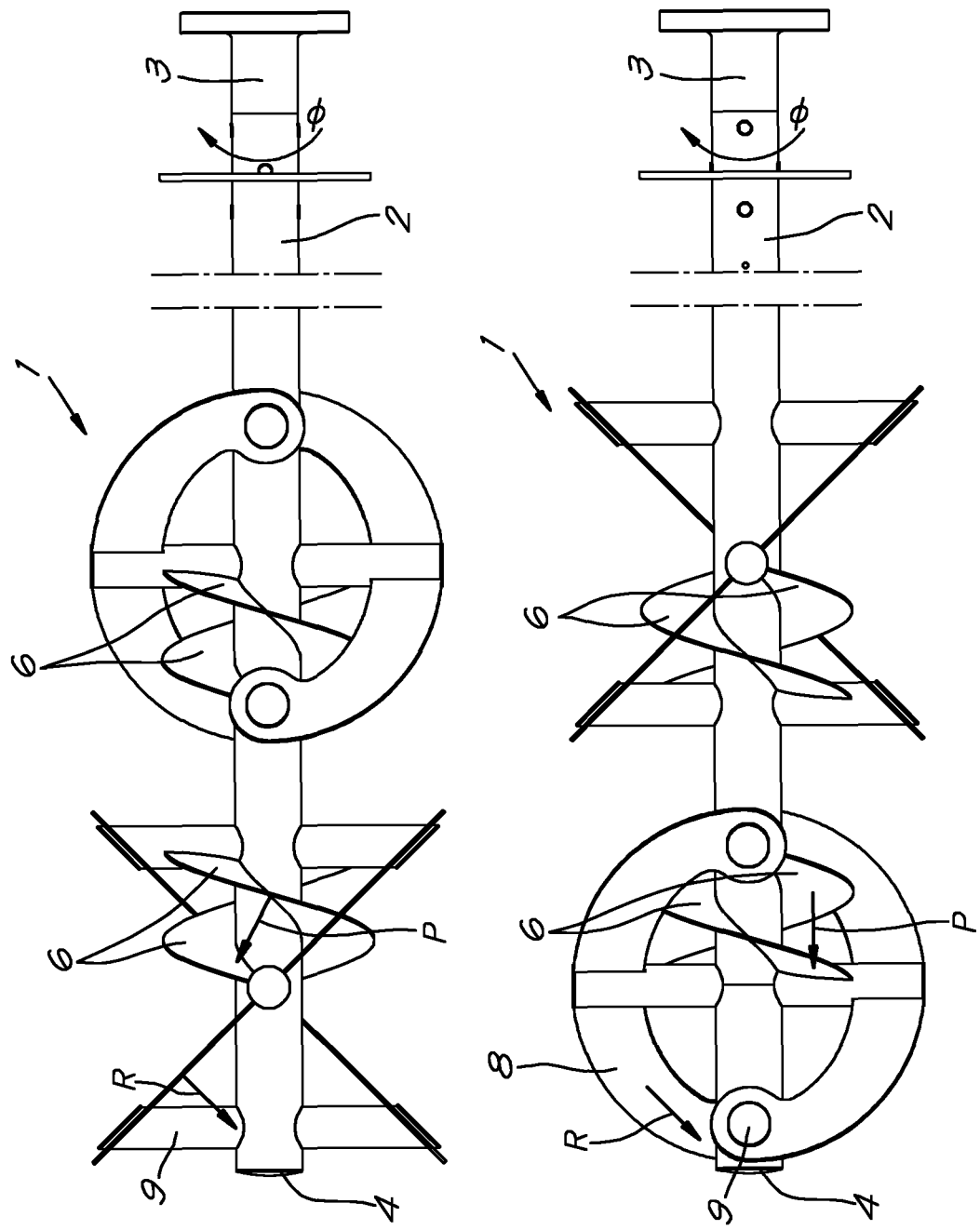

In order to explain the invention, any without limiting the invention in any way, examples of preferred embodiments are given below, referring to the following figures:

FIG. 1, showing a schematic view in perspective of a stirrer according to the invention;

FIG. 2, showing a side view of the stirrer of FIG. 1;

FIG. 3, showing a cross-section according to III-III of the stirrer of the previous figures;

FIG. 4, showing a cross-section according to IV-IV of the stirrer of the previous figures;

FIG. 5, showing a cross-section according to V-V of the stirrer of the previous figures;

FIG. 6a, showing the use of the stirrer of the previous figures;

FIG. 6b, showing the global molten glass displacement generated when the stirrer of the FIG. 6a is operating under stationary conditions;

FIG. 7, showing a schematic view in perspective of another stirrer according to the invention;

FIG. 8, showing a schematic view in perspective of yet another stirrer according to the invention;

FIG. 9, showing a schematic view in perspective of yet another stirrer according to the invention;

FIG. 10, showing a schematic view in perspective of yet another stirrer according to the invention;

FIG. 11, showing two side views, in directions which are mutually different by 90°, of yet another stirrer according to the invention.

Figure 12:
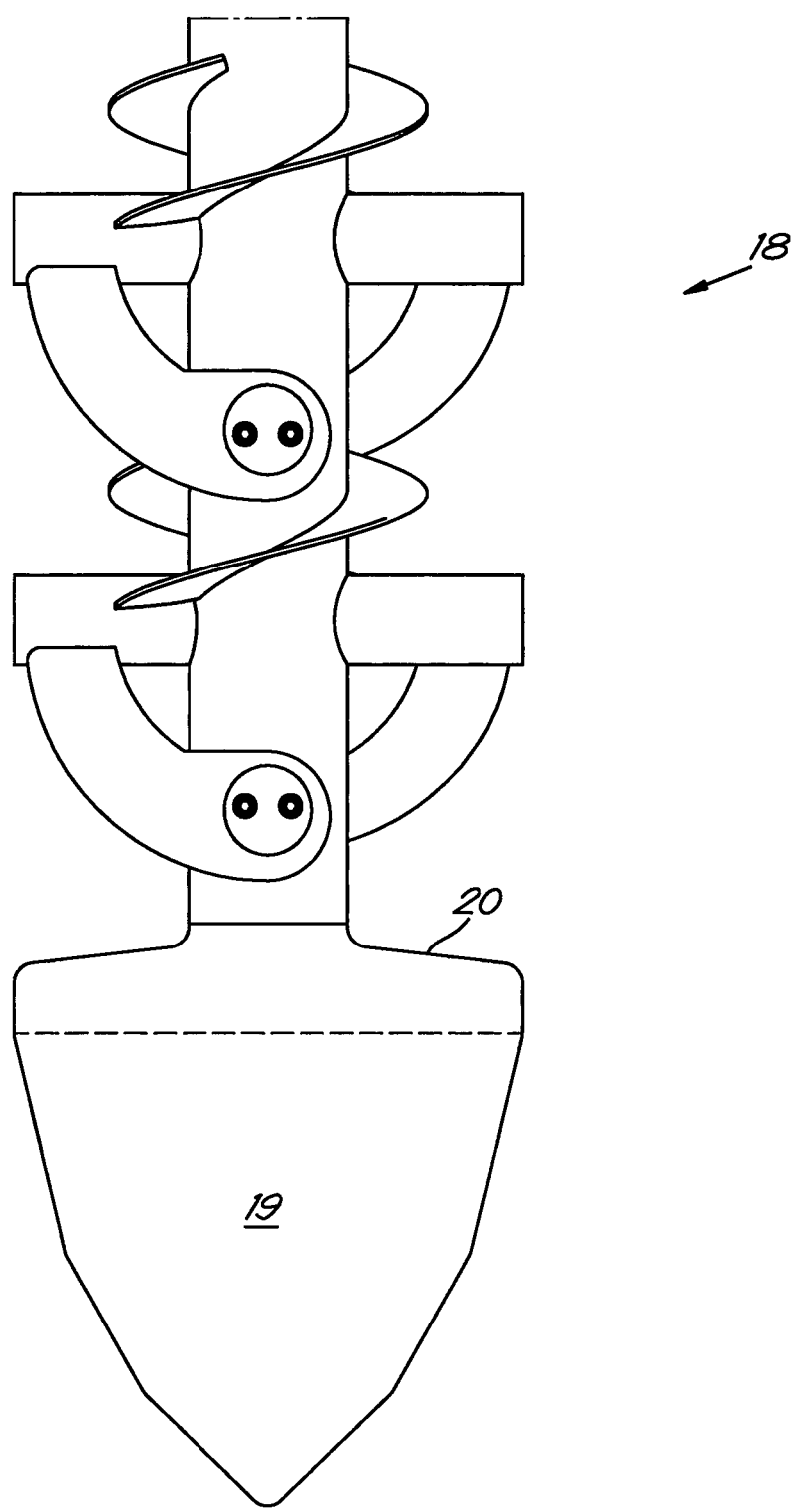
Figure 13:
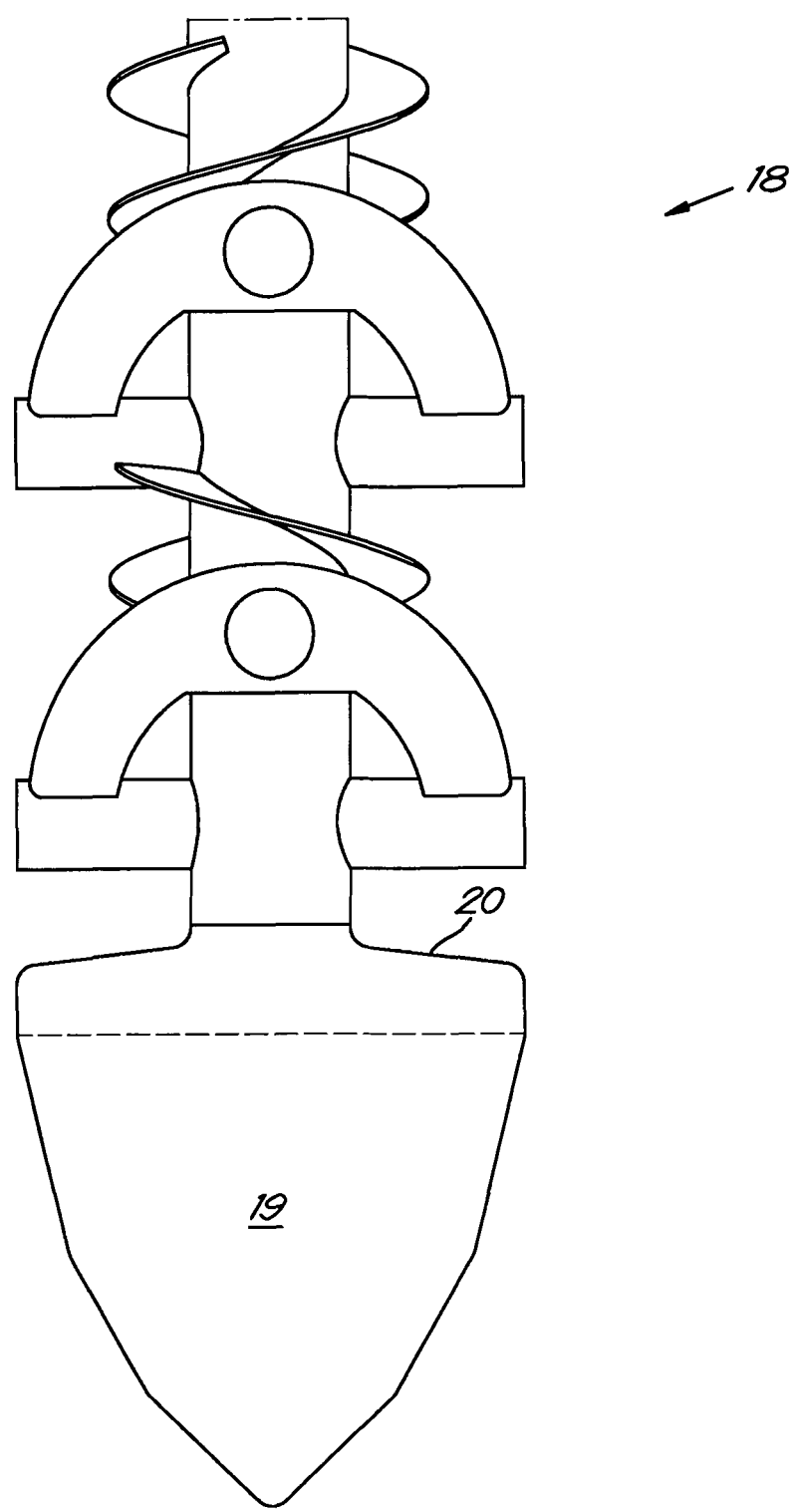
Figure 14:
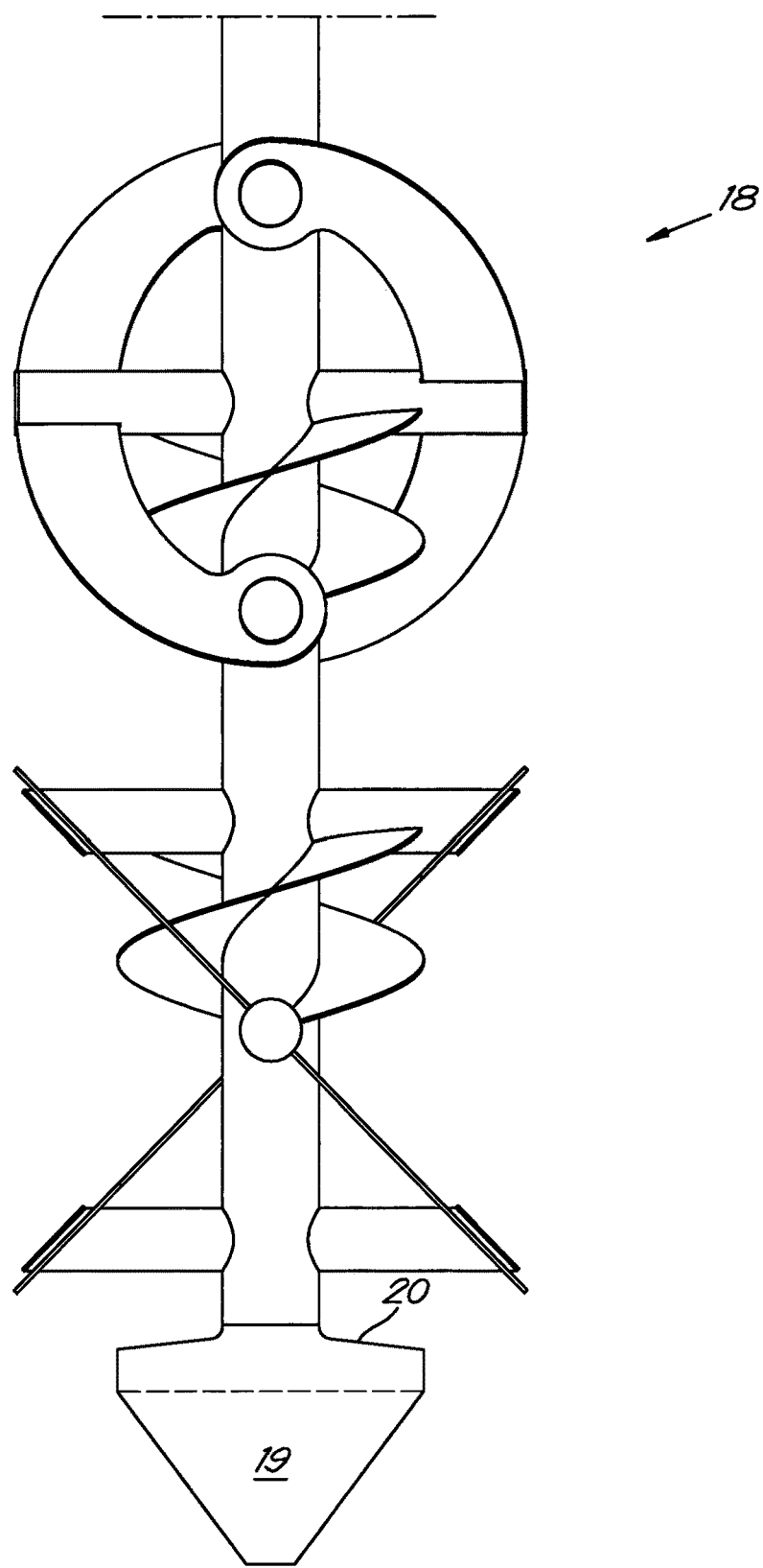
Figure 15:
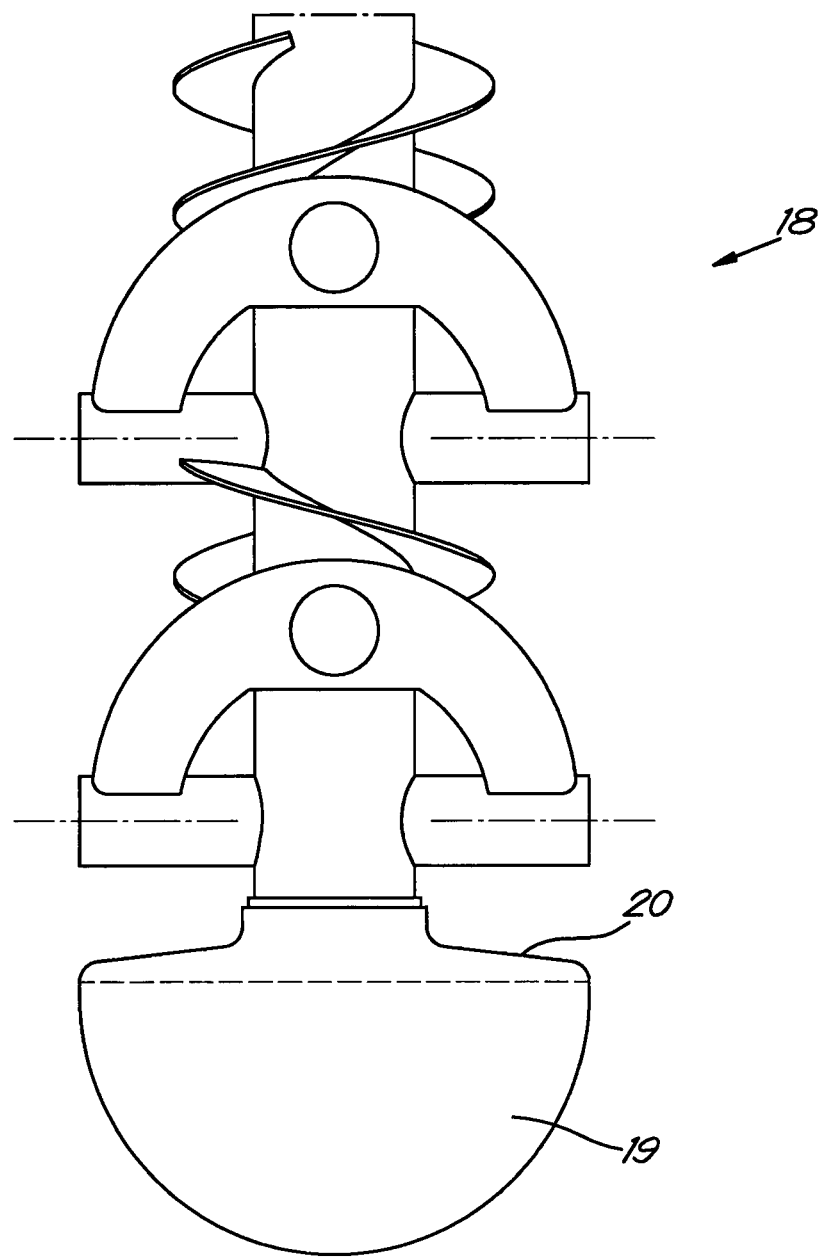

FIG. 12, showing a schematic view in perspective of a plunger according to the invention;

FIG. 13, showing a schematic view in perspective of yet another plunger according to the invention;

FIG. 14, showing a schematic view in perspective of yet another plunger according to the invention; and FIG. 15, showing a schematic view in perspective of yet another plunger according to the invention;

The stirrer 1 shown in FIGS. 1 to 5 consists mainly of a shaft 2, which is provided at one extreme with a connector 3 for connecting the shaft 2 to a drive, and nearer to the other extreme, further to be called the tip 4, with a number of stirrer blades. The shaft 2 has a central longitudinal axis L which during use will be the axis of rotation of the stirrer 1.

The stirrer blades can be grouped in two groups, more specifically inner stirrer blades 5,6, which are attached directly against the shaft 2 and which are helicoidally shaped, meaning shaped like a part of a helicoid, and outer stirrer blades 7, 8 which are attached to rods 9 which are attached to the shaft 2.

As depicted in FIG. 2, the outer stirrer blades 7,8 are flat blades, in particular open flat ring-shaped elliptical segments, which are mounted on the shaft 2 following a line formed by the intersection of a cylinder C and a plane P, said plane P forming an acute angle β', between 0° and 90° excluding said values, preferably between 10° and 80° including said values, more preferably between 20° and 70° including said values, with the central axis of the cylinder, said central axis of the cylinder being co-linear with the central axis L of the shaft 2 of the stirrer 1.

In a further preferred embodiment depicted in FIG. 2, the central axis L of the shaft 2 is coinciding with the central axis of the cylinder C.

In particular the central L axis is the central axis of both the cylinder and the shaft.

In the framework of the present invention, the open flat ring-shaped elliptical segment corresponds to a flat segment fully defined in the plane P and having a predetermined thickness.

The flat segment 7 has a frontal face 7a directed to the connector 3 and a dorsal face 7b directed to the tip 4, the frontal and dorsal faces being parallel to each other and being further parallel to the plane P (see FIG. 2).

Such an embodiment presents the advantage of allowing a continuous and homogeneous grasp of the molten glass due to an improved local pumping effect and shearing effect obtained due to the specific shape of the outer blades.

Furthermore, the outer stirrer blades which have a raised edge 10 at their outermost edge. The inner stirrer blades 5,6 make ¾ turns round the shaft 2 and the outer stirrer blades 7,8 make ¼ turn around the shaft 2.

In this embodiment, but not necessarily, the raised edged 10 is present both above as well as below the main body of the outer stirrer blades 7,8. This raised edge 10 serves to reinforce the outer stirrer blades 7,8, but also has a function to improve stirrer performance, as will be explained below.

The stirrer geometry will further be considered in a cylindrical coordinate system, similar to the cylindrical coordinate system 11 drawn in FIG. 1, but with the longitudinal axial coordinate z of the cylindrical coordinate system defined to coincide with the central axis L and having an increasing value from the connector 3 to the tip 4, and further having a radial coordinate ρ and an angular coordinate ϕ, defined to have an increasing value in clockwise direction when looking from the connector 3 to the tip 4.

There are four inner stirrer blades 5, 6. All are placed forming an angle α of circa 70° with the central longitudinal axis L, whereby due to the helicoidal shape of the inner stirrer blades 5, 6 the angle α can vary locally.

The two inner stirrer blades 5 closest to the tip have a normal vector N on the side of the tip 4 with a negative angular component $N_A$, so with a direction opposite to the defined direction of the angular coordinate ϕ, meaning that if the stirrer 1 is rotated in a positive angular direction ϕ during use, these inner stirrer blades 5 will create an axial displacement of molten glass away from the tip 4.

The two inner stirrer blades 6 furthest away from the tip 4 have a normal vector P on the side of the tip 4 with a positive angular component $P_A$, so with a direction coinciding with the defined direction of the angular coordinate ϕ, meaning that if the stirrer 1 is rotated in a positive angular direction ϕ during use, these inner stirrer blades 6 will create an axial displacement of molten glass towards the tip 4.

As all inner stirrer blades 5,6 are of the same size and shape, during use the combined inner stirrer blades 5,6 will not create any, or at least an insignificant, net displacement of molten glass, at any rotational speed.

The outer stirrer blades 7, 8 are placed on rods 9 which are attached to the shaft 2 at different angular and axial positions, more specifically at angular positions 90° apart, in line with the outer stirrer blades 7,8 making ¼ turn around the shaft 2. Each outer stirrer blade 7,8 is attached at both its ends to a different rod 9, and whereby some rods 9 are attached to the ends of two outer stirrer blades 7,8, and some other rods 9 are only a attached to the end of a single outer stirrer blade 7,8.

Note that in the present example the outer blades 7,8 are attached at or at least close to the ends of the rods 9. It is however also possible that outer blades 7,8 are attached to the rods 9 at a point between the attachment point to the shaft 2 and the free end of the rods 9.

The outer stirrer blades 7,8 are placed on the same axial section of the shaft 2 as the inner stirrer blades 5,6.

There are eight outer stirrer blades 7,8. They are all placed forming an angle β of circa 45° with the central longitudinal axis.

The four outer stirrer blades 7 closest to the tip 4 have a normal vector Q on the side of the tip 4 with a positive angular component $Q_A$, meaning that if the stirrer 1 is rotated in a positive angular direction ϕ during use, these outer stirrer blades 7 will create an axial displacement of molten glass towards the tip 4.

The four outer stirrer blades 8 furthest away from the tip 4 have a normal vector R on the side of the tip with a negative angular component $R_A$, meaning that if the stirrer is rotated in a positive angular direction ϕ during use, these outer stirrer blades 8 will create an axial displacement of molten glass away from the tip 4.

As all outer stirrer blades 7,8 are of the same size and shape, during use the combined outer stirrer blades 7,8 will not create any, or at least an insignificant, net displacement of molten glass, at any rotational speed.

The shaft 2, inner and outer stirrer blades 5,6,7,8, and the rods 9 are all made of dispersion-hardened platinum.

The use of the stirrer is simple and as follows, and as illustrated in FIG. 6a.

The stirrer is placed, connected with its connector 3 to a drive 12, in a stirring chamber 13 having an internal wall 21, which is provided with an inlet 14 and outlet for molten glass 15. The stirrer diameter d is only slightly smaller than the chamber diameter D, which is the diameter D of the internal wall 21 of the chamber. Molten glass 16 is made to flow through the mixing chamber and the stirrer is rotated, as shown in FIG. 6a, in this example clockwise as indicated by arrow A when looking from the drive 12 towards the tip 4.

In use under stationary conditions, two global cycling flows 17a, 17b of molten glass 16 are now established, both going repeatedly through the volumes swept by the stirrer blades 5,6,7,8 so that inhomogeneous regions are repeatedly elongated and chopped up and thereby become smaller and better dispersed in the molten glass 16. In particular the raised edge 10 is believed to play an important role in smearing the molten glass 16 close to the wall of the stirring chamber 13, thereby elongating impurities, to be chopped later by other actions of the stirrer 1.

The edge 10 also plays a role of stability of the outer blades movement during rotation of the stirrer.

By the presence of said edge 10, the mechanical stability of the outer blade is indeed preserved during use so that it is not subject to bending when cooperating with the molten glass material during stirring.

Only limited mixing between the two flows 17a, 17b occurs at the vertical level in the stirring chamber 13 where they meet. No significant cycling flow is established between the stirrer 1 and the wall of the stirring chamber 13, due to the narrow gap between them.

Due to the overall flow of molten glass from the inlet 14 to the outlet 15, molten glass is forced slowly from the upper cycling flow to the lower cycling flow, and then to the outlet 15.

In FIG. 6b, is provided the displacement of the fluid (or molten glass) for two units, a first unit a, and a second unit b, of the stirrer 1 along a I-I (for unit a) and a II-II (for unit b) sections.

In a particular embodiment disclosed in FIG. 6a, each of the units a, b, comprise three rods 9, and is defined between a first and a second rods parallel to each other. A third rod, perpendicular to the first and second rods, is placed between said first and second rods.

In the first and second units, inner stirrer blades 5,6 are attached directly against the shaft 2 and are helicoidally shaped, meaning shaped like a part of a helicoid, and outer stirrer blades 7, 8 are attached to rods 9 which are attached to the shaft 2, so that the first and second units a, b forms a stirring element of the stirrer as depicted in FIGS. 1 to 5.

A first cycling flow 17a (FIG. 6b—section I-I) of molten glass 16 is established in a first volume defined in the first unit a.

In the first unit a, an intern region 22b is substantially defined by the diameter of the inner blades 6, and by a distance d' between a first and a second rods defining said first unit a.

In this intern region 22b of the first unit a, when the stirrer is rotated clockwise as indicated by arrow A when looking from the drive 12 towards the tip 4, the molten glass is displaced along the shaft 2 in direction of the connector 3 (upwards).

Moreover, in the first unit a, an outer region 23b is substantially defined by the diameter d of the outer blades 7, and by the distance d' between said first and second rods defining said first unit a.

In this outer region 23b of the first unit a, when the stirrer is rotated clockwise as indicated by arrow A when looking from the drive 12 towards the tip 4, the molten glass is displaced along the shaft 2 in direction of the tip 4 (downwards).

The first cycling flow 17a of molten glass 16 results in the combination of the inner and outer displacements, in the first unit a, of the molten glass along the shaft 2.

A second cycling flow 17b (FIG. 6b—section II-II) of molten glass 16 is established in a second volume defined in the second unit b.

In the second unit b, an intern region 22a is substantially defined by the diameter of the inner blades 6, and by a distance d" between said first and said second rods defining said second unit b.

In this intern region 22a of the second unit b, when the stirrer is rotated clockwise as indicated by arrow A when looking from the drive 12 towards the tip 4, the molten glass is displaced along the shaft 2 in direction of the tip 4 (downwards).

Moreover, in this second unit b, an outer region 23a is substantially defined by the diameter d of the outer blades 7, and by the distance d" between a first and a second rods defining said second unit b.

In this outer region 23a of the second unit b, when the stirrer is rotated clockwise as indicated by arrow A when looking from the drive 12 towards the tip 4, the molten glass is displaced along the shaft 2 in direction of the connector 3 (upwards).

The second cycling flow 17b of molten glass 16 results in the combination of the inner and outer displacements, in the second unit b, of the molten glass along the shaft 2.

Note that in possible variants, especially in batch processing of molten glass, the stirrer may be significantly smaller than the stirring chamber, which is in that case formed by the vessel in which the stirring is performed.

In yet another variant the stirrer may be placed in a long channel through which glass flows, whereby the channel itself forms the stirring chamber.

The alternative stirrers shown in FIGS. 7 to 11 differ from the stirrer shown in FIG. 1 by having a different number and different arrangement of inner and outer stirrer blades.

The stirrer 1 shown in FIG. 7 has the same number and arrangement of inner stirrer blades 5, 6 as the stirrer of FIG. 1. The arrangement of outer stirrer blades 8 is different, in that this stirrer has six outer stirrer blades 8, which are all positioned so that they have a normal vector R on the side of the tip 4 with a negative angular component. This stirrer 1 has an outer pumping effect, when rotated in a positive angular direction $\phi$, away from the tip. This pumping effect is dependent on the rotational speed of the stirrer 1 so that this stirrer 1 is mostly suitable for batch-wise processing of molten glass.

The stirrer 1 shown in FIG. 8 has the same number and arrangement of inner stirrer blades 5,6 as the stirrer 1 of FIGS. 1 and 7. The arrangement of outer stirrer blades is different, in that in addition to the outer stirrer blades 8 of the stirrer 1 of FIG. 7, the stirrer 1 of FIG. 8 has six more outer stirrer blades 7, which additional outer stirrer blades 7 are all positioned so that they have a normal vector Q on the side of the tip 4 with a positive angular component. This stirrer 1 has no net pumping effect.

The stirrer 1 shown in FIG. 9 has a different arrangement of inner stirrer blades 5 than the previously described stirrers 1. All four inner stirrer blades 5 are placed so that they have a normal vector N on the side of the tip 4 with a negative angular component, meaning that if the stirrer 1 is rotated in a positive angular direction $\phi$ during use, the inner stirrer blade 5 will create an axial displacement of molten glass away from the tip 4. The outer stirrer blades 7,8 are arranged similarly to the outer stirrer blades 7, 8 of the stirrer of FIG. 8, only their total number is eight, instead of twelve.

As the outer stirrer blades 7, 8 together do not have a net pumping effect, and the inner stirrer blades 5 do, this stirrer 1 has a net pumping effect.

The stirrer 1 shown in FIG. 10 only has a single set of two inner stirrer blades 5, both placed so that they have a normal vector N on the side of the tip 4 with a negative angular component, meaning that if the stirrer 1 is rotated in a positive angular direction $\phi$ during use, the inner stirrer blade 5 will create an axial displacement of molten glass away from the tip 4. The outer stirrer blades 8 are arranged like the outer stirrer blades 8 of the stirrer of FIG. 7, only their total number is four, instead of six. This stirrer 1 has a particularly strong pumping effect, so that it is mostly suitable for use in batch processing, although it may be used in continuous processes as well when there is a requirement for a pumping effect.

The stirrer 1 shown in FIG. 11 has four inner stirrer blades 6 which are placed so that they have a normal vector P on the side of the tip 4 with a positive angular component, meaning that if the stirrer 1 is rotated in a positive angular direction $\phi$ during use, the inner stirrer blade 5 will create an axial displacement of molten glass away towards the tip 4.

The outer stirrer blades 8 are arranged in two groups of fours, which are both similar to the four outer stirrer blades 8 of the stirrer 1 of FIG. 1 that are placed away from the tip 4. These have a normal vector R on the side of the tip with a negative angular component, meaning that if the stirrer is rotated in a positive angular direction $\phi$ during use, these outer stirrer blades 8 will create an axial displacement of molten glass away from the tip 4.

For completeness it is noted that also the connector 3 is executed differently.

It is noted that in the above examples the rods 9 extend only in radial direction from the shaft 2 and are straight rods. It is of course also possible that the rods 9 additionally have an axial and/or angular direction and/or that they are curved.

It is further noted that in the examples above the outer stirrer blades 7,8 each have a single normal vector.

It is also possible that an outer stirrer blade has different blade sections with different normal vectors. It is also possible that an outer stirrer blade has several blade sections with a normal vectors with mutually different angular components.

Such an outer stirrer blade could for instance be a combination of the outer stirrer blades identified by numbers 7 and 8 in FIG. 9.

These two outer stirrer blades lie in the same plane, and could therefore easily be made as a single outer stirrer blade from a single straight sheet with a blade section corresponding to outer stirrer blade 7 and a blade section corresponding to outer stirrer blade 8.

This single outer stirrer blade would then be mounted on the shaft as in FIG. 9 but by executing the rod between outer stirrer blades 7 and 8 shorter than in FIG. 9, so that this rod would support the single combined outer stirrer blade only on one side, the side facing the shaft 2.

The present invention also concerns a plunger or a gobber 18.

The plunger 18 is made of the stirrer 1 according to the invention on which a gobbing element 19 or gobbing member is mounted on the tip 4 of the stirrer.

FIGS. 12 to 15 provides several embodiments of the plunger 18 according to the present invention.

The plunger depicted in FIG. 12 corresponds to the stirrer of FIG. 7, but on which a gobbing element, such a piston or gobbing piston has been bound.

The plunger depicted in FIGS. 13 and 15 corresponds to the stirrer of FIG. 8, but on which a gobbing element, such a piston or gobbing piston has been bound.

The plunger depicted in FIG. 14 corresponds to the stirrer of FIG. 11, but on which a gobbing element, such a piston or gobbing piston has been bound.

During operation, the plunger or gobber 18 is placed in a gobbing chamber and is put into a movement of translation along the L axis for gobbing molten glass out of the gobbing chamber.

With the plunger or gobber 18 according to the present invention, if said gobber is put into rotation and translation simultaneously or alternatively, the benefits of said gobber/plunger when used in this way is twice: i) it allows a simultaneous stirring and gobbing of the molten glass, so that the molten glass can be continuously homogenized when being gobbed; and ii) it allows a stirring of the molten glass before the gobbing step, so that the molten glass can be homogenized during a certain period before being gobbed.

For each of these plungers, the gobbing member 19, or gobbing element, or gobbing piston is welded to the tip 4 of the shaft of the corresponding stirrer.

In addition, in a preferred embodiment of the plungers according to the present invention, the gobbing element 19 may have different shapes.

For instance, in the plungers of FIGS. 12 to 14, the gobbing element is a cone or truncated cone with its basis welded on the tip 4 through a cup-shaped connection means 20, the base of the cone being in contact with and welded to a first face of said connection means 20 and a second face of the connection means, opposed to said first face, being directly welded to the tip 4 of the stirrer.

In the plunger depicted in FIG. 15, the gobbing element 19 has a semi-spherical shape with basis that is directly welded to the frontal face of the connection means 20.

In a preferred embodiment of the stirrer and plunger according to the invention, the stirrer and the plunger are made of platinum or a platinum alloy or of molybdenum or a molybdenum-based alloy, or of iridium or an iridium-based alloy.

It is understood that the present invention is by no means limited to the forms of the above embodiments and that many modifications can be made without departing from the scope of the appended claims.

The invention claimed is:

1. Stirrer (1) for stirring molten glass (16), whereby the stirrer (1) comprises
a shaft (2) having a tip (4) and having a central longitudinal axis (L), and
one or more inner stirrer blades (5, 6) which are attached to the shaft (2), and
one or more outer stirrer blades (7, 8) which are attached to the shaft (2), whereby the one or more inner stirrer blades (5, 6) are attached closer to the shaft (2) than the one or more outer stirrer blades (7, 8),
whereby, when considering the stirrer in a cylindrical coordinate system (11) with the longitudinal axial coordinate (z) of the cylindrical coordinate system (11) defined to coincide with the central longitudinal axis (L), whereby the cylindrical coordinate system (11) is further defined by a radial coordinate ($\rho$) and an angular coordinate ($\varphi$), both the one or more inner stirrer blades (5,6) as well as the one or more outer stirrer blades (7,8) are disposed at an angle ($\alpha$, $\beta$) to the central longitudinal axis (L), whereby said angle ($\alpha$, $\beta$) is between 0° and 90° not including these values, and are disposed having a least a blade section with a normal vector (N, P, Q, R), on the side directed towards the tip (4), with an angular component ($N_A$, $P_A$, $Q_A$, $R_A$), and wherein the one or more inner stirrer blades (5,6) are helicoidal blades or a helicoidal blade, and
wherein the angular component ($N_A$, $P_A$, $Q_A$, $R_A$) of said normal vector (N, P, Q, R) of at least a blade section of one or more of said inner and outer stirrer blades (5, 6, 7, 8) is negative and the angular component ($N_A$, $P_A$, $Q_A$, $R_A$) of said normal vector (N, P, Q, R) of at least a blade section of one or more of the inner and outer stirrer blades (5, 6, 7, 8) is positive.

2. Stirrer according to claim 1, wherein the one or more outer stirrer blades (7,8) are mounted on rods (9) or tubes extending at least partially in a radial direction from the shaft (2).

3. Stirrer according to claim 2, wherein the one or more outer stirrer blades (7,8) are each mounted on two or more of said rods (9) or tubes, whereby the rods (9) or tubes used for mounting an outer stirrer blade (7,8) are placed at angular positions on the shaft which are mutually different by at least 30°.

4. Stirrer according to claim 2, wherein at least one of the outer stirrer blades (7,8) is an open flat ring-shaped elliptical segment, said at least one open flat ring-shaped elliptical segment being placed following a line formed by the intersection of a cylinder and a plane making an angle ($\beta$), between 0° and 90° excluding said values, with the central axis of that cylinder, said central axis of the cylinder being co-linear with the central axis (L) of the shaft (2) of the stirrer (1).

5. Stirrer according to claim 2, wherein the outer edge of at least one of the one or more outer stirrer blades (7,8) is provided with a raised edge (10).

6. Stirrer according to claim 1, wherein the stirrer comprises two or more of said inner stirrer blades (5,6), whereby the angular component ($N_A$, $P_A$) of the normal vector (N, P) of at least one of said inner stirrer blades (5,6) is negative and the angular component ($N_A$, $P_A$) of the normal vector (N, P) of at least one other of said inner stirrer blades (5,6) is positive and whereby the number and size of said inner stirrer blades (5,6) having a normal vector (N, P) with a negative angular component ($N_A$, $P_A$) is the same as the number and size of said inner stirrer blades having a normal vector (N, P) with a positive angular component ($N_A$, $P_A$).

7. Stirrer according to claim 1, wherein the one or more outer stirrer blades (7,8) in totality comprise two or more blade sections, whereby the angular component ($Q_A$, $R_A$) of the normal vector (Q, R) of at least one of said blade sections is negative and the angular component ($Q_A$, $R_A$) of the normal vector (Q, R) of at least one other of said blade sections is positive and whereby the number and size of said blade sections having a normal vector (Q, R) with a negative angular component ($Q_A$, $R_A$) is the same as the number and size of said blade sections having a normal vector (Q, R) with a positive angular component ($Q_A$, $R_A$).

8. Stirrer according to claim 1, wherein at least a blade section of one of said one or more outer stirrer blades (7,8) extends over a certain axial section of the shaft (1), whereby at least one of said one or more inner stirrer blades (5,6) is placed in the same axial section, whereby the signs of the angular components ($N_A$, $P_A$, $Q_A$, $R_A$) of the normal vectors (N, P, Q, R) of this inner stirrer blade (5,6) and this blade section of the outer stirrer blade (7,8) are opposite.

9. Stirrer according to claim 1, wherein at least some of said one or more inner and outer stirrer blades (5,6,7,8) are disposed at an angle ($\alpha$, $\beta$) to the central longitudinal axis (L) which is between 10° and 80° including said values.

10. Stirrer (1) according to claim 1, wherein said stirrer (1) is made of platinum or a platinum alloy or of molybdenum or a molybdenum-based alloy, or of iridium or an iridium-based alloy.

11. Stirrer (1) for stirring molten glass (16), whereby the stirrer (1) comprises
a shaft (2) having a tip (4) and having a central longitudinal axis (L), and
one or more inner stirrer blades (5, 6) which are attached to the shaft (2), and
one or more outer stirrer blades (7, 8) which are attached to the shaft (2), whereby the one or more inner stirrer blades (5, 6) are attached closer to the shaft (2) than the one or more outer stirrer blades (7, 8),
whereby, when considering the stirrer in a cylindrical coordinate system (11) with the longitudinal axial coordinate (z) of the cylindrical coordinate system (11) defined to coincide with the central longitudinal axis (L), whereby the cylindrical coordinate system (11) is further defined by a radial coordinate ($\rho$) and an angular coordinate ($\varphi$), both the one or more inner stirrer blades (5,6) as well as the one or more outer stirrer blades (7,8) disposed at an angle ($\alpha$, $\beta$) to the central longitudinal axis (L), whereby said angle ($\alpha$, $\beta$) is between 0° and 90° not including these values, and are disposed having a least a blade section with a normal vector (N, P, Q, R), on the side directed towards the tip (4), with an angular component ($N_A$, $P_A$, $Q_A$, $R_A$), and wherein the one or more inner stirrer blades (5,6) are helicoidal blades or a helicoidal blade and wherein the one or more helicoidal inner stirrer blades (5,6) are mounted directly against the shaft (2).

12. Stirrer (1) for stirring molten glass (16), whereby the stirrer (1) comprises
a shaft (2) having a tip (4) and having a central longitudinal axis (L), and
two or more inner stirrer blades (5,6) which are attached to the shaft (2), and
two or more outer stirrer blades (7,8) which are attached to the shaft (2), whereby the inner stirrer blades (5,6) are attached closer to the shaft (2) than the outer stirrer blades (7,8),
whereby, when considering the stirrer in a cylindrical coordinate system (11) with the longitudinal axial coordinate (z) of the cylindrical coordinate system (11) defined to coincide with the central longitudinal axis (L), whereby the cylindrical coordinate system (11) is further defined by a radial coordinate ($\rho$) and an angular coordinate ($\varphi$), both the two or more inner stirrer blades (5,6) as well as the one or more outer stirrer blades (7,8) are disposed at an angle ($\alpha$, $\beta$) to the central longitudinal axis (L), whereby said angle ($\alpha$, $\beta$) is between 0° and 90° not including these values, and are disposed having a least a blade section with a normal vector (N, P, Q, R), on the side directed towards the tip (4), with an angular component ($N_A$, $P_A$, $Q_A$, $R_A$), and wherein the two or more outer stirrer blades (7,8) each have two ends, whereby each of these ends is mounted on a different one of said rods (9) or tubes, whereby the rods (9) or tubes used for mounting the ends of a specific outer stirrer blade (7,8) have a different angular position and/or axial position on the shaft (2).

13. Stirrer according to claim 12, wherein the two or more outer stirrer blades (7,8) are each mounted on two or more of said rods (9) or tubes, whereby the rods (9) or tubes used for mounting an outer stirrer blade (7,8) are placed at angular positions on the shaft which are mutually different by at least 30°.

14. Stirrer according to claim 12 wherein there are a plurality of inner stirrer blades (5,6) that have a helicoidal configuration and at least one pair of the inner stirrer blades are axially spaced apart and configured to direct molten glass flow toward each other.

15. Stirrer according to claim 12, wherein said rods (9) or tubes that receive the outer stirrer blade ends have, respective, different angular positions.

16. A plunger (18) for gobbing molten glass, said plunger comprising a stirrer (1) for stirring molten glass (16), whereby the stirrer (1) comprise
a shaft (2) having a tip (4) and having a central longitudinal axis (L), and
one or more inner stirrer blades (5, 6) which are attached to the shaft (2), and
one or more outer stirrer blades (7, 8) which are attached to the shaft (2), whereby the one or more inner stirrer blades (5, 6) are attached closer to the shaft (2) than the one or more outer stirrer blades (7, 8),
whereby, when considering the stirrer in a cylindrical coordinate system (11) with longitudinal axial coordinate (z) of the cylindrical coordinate system (11) defined to coincide with the central longitudinal axis (L), whereby the cylindrical coordinate system (11) is further defined by a radial coordinate ($\rho$) and an angular coordinate ($\varphi$), both the one or more inner stirrer blades (5,6) as well as the one or more outer stirrer blades (7,8) are disposed at an angle ($\alpha$, $\beta$) to the central longitudinal axis (L), whereby said angle ($\alpha$, $\beta$) is between 0° and 90° not including these values, and are disposed having a least a blade section with a normal vector (N, P, Q, R), on the side directed towards the tip (4), with an angular component ($N_A$, $P_A$, $Q_A$, $R_A$), and wherein the one or more inner stirrer blades (5,6) are helicoidal blades or a helicoidal blade, and said stirrer (1) comprising on its tip (4) a gobbing element (19).

17. Plunger (18) according to claim 16, wherein said plunger (18) is made of platinum or a platinum alloy or of molybdenum or a molybdenum-based alloy, or of iridium or an iridium-based alloy.

18. Stirrer (1) for stirring molten glass (16), whereby the stirrer (1) comprises
a shaft (2) having a tip (4) and having a central longitudinal axis (L), and
two or more inner stirrer blades (5,6) which are attached to the shaft (2), and
one or more outer stirrer blades (7,8) which are attached to the shaft (2), whereby the two or more inner stirrer blades (5,6) are attached closer to the shaft (2) than the one or more outer stirrer blades (7,8),
whereby, when considering the stirrer in a cylindrical coordinate system (11) with the longitudinal axial coordinate (z) of the cylindrical coordinate system (11) defined to coincide with the central longitudinal axis (L), whereby the cylindrical coordinate system (11) is further defined by a radial coordinate ($\rho$) and an angular coordinate ($\varphi$), both the one or more inner stirrer blades (5,6) as well as the one or more outer stirrer blades (7,8) are disposed at an angle ($\alpha$, $\beta$) to the central longitudinal axis (L), whereby said angle ($\alpha$, $\beta$) is between 0° and 90° not including these values, and are disposed having a least a blade section with a normal vector (N, P, Q, R), on the side directed towards the tip (4), with an angular component ($N_A$, $P_A$, $Q_A$, $R_A$), and wherein the two or more inner stirrer blades (5,6) include at least two independent, axially spaced inner stirrer blades (5,6) that are configured to promote molten glass flow in an axial direction toward each other.

19. Stirrer according to claim 18, wherein the angular component ($N_A$, $P_A$) of the normal vector (N, P) of a first of said at least two independent, axially spaced inner stirrer blades (5,6) is negative and the angular component ($N_A$, $P_A$) of the normal vector (N, P) of at least the second of said at least two independent axially spaced inner stirrer blades (5,6) is positive and whereby the number and size of said inner stirrer blades (5,6) having a normal vector (N, P) with a negative angular component ($N_A$, $P_A$) is the same as the number and size of said inner stirrer blades having a normal vector (N, P) with a positive angular component ($N_A$, $P_A$).

20. Stirrer according to claim 19, wherein the angular component ($N_A$, $P_A$, $Q_A$, $R_A$) of said normal vector (N, P, Q, R) of at least one of said outer stirrer blades (7, 8) is negative and the angular component ($N_A$, $P_A$, $Q_A$, $R_A$) of said normal vector (N, P, Q, R) of at least a second of said outer stirrer blades (7, 8) is positive such that all of the inner and outer stirrer blades (5, 6, 7, 8) of the stirrer avoid a pumping effect on the molten glass received by the stirrer.

21. A stirrer (1) for stirring molten glass (16), whereby the stirrer (1) comprises
    a shaft (2) having a tip (4) and having a central longitudinal axis (L), and
    one or more inner stirrer blades (5, 6) which are attached to the shaft (2), and
    one or more outer stirrer blades (7, 8) which are attached to the shaft (2), whereby the one or more inner stirrer blades (5, 6) are attached closer to the shaft (2) than the one or more outer stirrer blades (7, 8),
    whereby, when considering the stirrer in a cylindrical coordinate system (11) with the longitudinal axial coordinate (z) of the cylindrical coordinate system (11) defined to coincide with the central longitudinal axis (L), whereby the cylindrical coordinate system (11) is further defined by a radial coordinate ($\rho$) and an angular coordinate ($\varphi$), both the one or more inner stirrer blades (5,6) as well as the one or more outer stirrer blades (7,8) are disposed at an angle ($\alpha$, $\beta$) to the central longitudinal axis (L), whereby said angle ($\alpha$, $\beta$) is between 0° and 90° not including these values, and are disposed having a least a blade section with a normal vector (N, P, Q, R), on the side directed towards the tip (4), with an angular component ($N_A$, $P_A$, $Q_A$, $R_A$), wherein the one or more inner stirrer blades (5,6) are helicoidal blades or a helicoidal blade, wherein the one or more outer stirrer blades (7,8) are mounted on rods (9) or tubes extending at least partially in a radial direction from the shaft (2), and wherein the one or more outer stirrer blades (7,8) are each mounted on two or more of said rods (9) or tubes, whereby the rods (9) or tubes used for mounting an outer stirrer blade (7,8) are placed at angular positions on the shaft which are mutually different by at least 30°.

* * * * *

UNITED STATES PATENT AND TRADEMARK OFFICE
CERTIFICATE OF CORRECTION

| | | |
|---|---|---|
| PATENT NO. | : 10,676,385 B2 | Page 1 of 1 |
| APPLICATION NO. | : 15/552589 | |
| DATED | : June 9, 2020 | |
| INVENTOR(S) | : Jörg Schollmayer and Michael Heitzenröther | |

It is certified that error appears in the above-identified patent and that said Letters Patent is hereby corrected as shown below:

On the Title Page

Item (54), Title and in the Specification, Column 1, Line 1 reads:
DEVICE FOR STIRRING MOLTEN GAS Should read:
-- DEVICE FOR STIRRING MOLTEN GLASS --

Signed and Sealed this
Twelfth Day of January, 2021

Andrei Iancu
*Director of the United States Patent and Trademark Office*